United States Patent
Brim et al.

(10) Patent No.: US 7,022,024 B2
(45) Date of Patent: Apr. 4, 2006

(54) BOWLING CENTER DISPLAY AND METHOD

(75) Inventors: Ted A. Brim, Grand Haven, MI (US); Roy A. Burkholder, Whitehall, MI (US); Raymond R. Fineran, Jr., North Muskegon, MI (US); Michael T. Nousain, Fruitport, MI (US); Gordon Stannis, West Olive, MI (US); Joel G. Van Faasen, Holland, MI (US); Jan Hansen, Kungsbacka (SE)

(73) Assignee: Brunswick Bowling & Billiards Corporation, Muskegon, MI (US)

( * ) Notice: Subject to any disclaimer, the term of this patent is extended or adjusted under 35 U.S.C. 154(b) by 39 days.

(21) Appl. No.: 10/891,403

(22) Filed: Jul. 14, 2004

(65) Prior Publication Data

US 2005/0037853 A1 Feb. 17, 2005

Related U.S. Application Data

(63) Continuation of application No. 10/827,795, filed on Apr. 20, 2004, now abandoned, which is a continuation-in-part of application No. 10/224,142, filed on Aug. 20, 2002, now abandoned, which is a continuation-in-part of application No. 09/575,950, filed on May 23, 2000, now Pat. No. 6,450,892, which is a continuation-in-part of application No. 09/060,914, filed on Apr. 15, 1998, now abandoned.

(51) Int. Cl.
*A63D 1/04* (2006.01)

(52) U.S. Cl. ...................................... 473/115; 473/117

(58) Field of Classification Search ................ 473/115, 473/116, 54; 40/600, 611; 52/41, 408; 156/71, 156/94, 152, 306.6, 389, 574, 577; 428/44
See application file for complete search history.

(56) References Cited

U.S. PATENT DOCUMENTS

| | | | | |
|---|---|---|---|---|
| 3,857,192 A | * | 12/1974 | Mascolo | 40/772 |
| 4,225,369 A | * | 9/1980 | Felchlin | 156/71 |
| 4,271,622 A | * | 6/1981 | Tippmann et al. | 40/606.03 |
| 4,944,514 A | * | 7/1990 | Suiter | 473/117 |
| 5,167,087 A | * | 12/1992 | Plumly | 40/600 |
| 5,258,214 A | * | 11/1993 | Cooledge et al. | 428/43 |
| 5,303,493 A | * | 4/1994 | Plumly | 40/600 |
| 5,353,535 A | * | 10/1994 | Plumly | 40/600 |

(Continued)

FOREIGN PATENT DOCUMENTS

WO 94/08328 * 4/1994

*Primary Examiner*—William M. Pierce
(74) *Attorney, Agent, or Firm*—Dykema Gossett PLLC

(57) ABSTRACT

A display and method for bowling centers and the like includes at least one bowling lane having a base member with an approach area, pin deck area and lane area extending therebetween. A generally transparent synthetic sheet member is positioned over at least a portion the base member, and has a leading edge attached to the base member to retain the sheet member in an overlying relationship with the base member, leaving at least a portion of the sheet member unattached to define an insert area. At least one display card with in a generally thin profile is inserted between the sheet member and the base member at the insert area, such that the indicia are visible through and protected by the sheet, with the weight of the sheet member retaining the display card in place to facilitate easy insertion and removal of the display card to provide varied displays.

89 Claims, 12 Drawing Sheets

U.S. PATENT DOCUMENTS

| | | | |
|---|---|---|---|
| 5,472,381 A * | 12/1995 | Ayre, Jr. | 473/115 |
| 5,489,241 A * | 2/1996 | Perrier | 473/115 |
| 5,524,373 A * | 6/1996 | Plumly | 40/600 |
| 5,529,541 A * | 6/1996 | Perrier | 473/54 |
| 5,540,624 A * | 7/1996 | Hixson | 473/115 |
| 5,549,516 A * | 8/1996 | Heddon | 473/115 |
| RE35,778 E * | 4/1998 | Stirling et al. | 428/63 |
| 5,863,632 A * | 1/1999 | Bisker | 428/44 |
| 5,888,142 A * | 3/1999 | Perrier | 473/54 |
| 6,250,001 B1 * | 6/2001 | Gillespie | 40/600 |
| 6,450,892 B1 * | 9/2002 | Burkholder et al. | 473/115 |
| 6,712,532 B1 * | 3/2004 | Look | 400/120.01 |
| 6,840,868 B1 * | 1/2005 | Perrier et al. | 473/54 |

* cited by examiner

BOWLING CENTER DISPLAY AND METHOD

CROSS REFERENCE TO RELATED APPLICATION AND CLAIM TO PRIORITY

The present application is a continuation of U.S. patent application Ser. No. 10/827,795, filed Apr. 20, 2004, which is a continuation-in-part of commonly assigned, co-pending U.S. patent application Ser. No. 10/224,142, filed Aug. 20, 2002, which is a continuation-in-part of application Ser. No. 09/575,950, filed May 23, 2000, now U.S. Pat. No. 6,450,892, which is a continuation-in-part of application Ser. No. 09/060,914, filed Apr. 15, 1998, now abandoned, and claims priority thereto under 35 U.S.C. § 120.

BACKGROUND OF THE INVENTION

The present invention relates to bowling, and in particular to a display and associated method for bowling centers and the like.

Historically, league bowling has been a primary profit source for bowling center proprietors, due primarily to the regularity of league bowling activity. During the past 20 years, participation in league bowling has declined substantially. Consequently, bowling center proprietors have attempted to expand interest in open bowling and other forms of casual bowling to enhance revenues.

Modern bowling centers are typically equipped with other forms of entertainment, such as billiards, pinball, computer games, video games and the like to attract a wider audience of customers. Such bowling centers are becoming popular entertainment sites for families, as well as casual and skilled bowlers. Special audio systems, as well as lighting systems and the like, have been installed to create an exciting atmosphere within the bowling center. Bumper bowling has become a popular activity for children and other less skilled bowlers. Since modem bowling centers typically include food service facilities, bowling centers present a cost effective forum for children's birthday parties, and other similar occasions and/or events.

Bowling center proprietors constantly seek additional enhancements to improve the entertainment value of their bowling centers, and recognize additional revenues. Consequently, a need exists to enhance bowling centers in a manner that will render them more attractive to a wider range of customers.

SUMMARY OF THE INVENTION

One aspect of the present invention is a display for bowling centers of the type having at least one bowling lane, comprising a base member including an approach area, a pin deck area and a lane area extending between the approach area and the pin deck area. A synthetic sheet member overlies at least the lane area of the base member, and includes a leading end disposed adjacent to the approach area, a trailing end disposed adjacent to the pin deck area and a central portion disposed over the lane area. The synthetic sheet member is generally transparent, and is adapted to roll a bowling ball thereover. An attachment member securely attaches the leading end of the synthetic sheet member to the base member adjacent the approach area to retain the synthetic sheet member in an overlying relationship with the base member, whereby at least a portion of the central portion of the synthetic lane member is unattached to the base member to define an insert area of the bowling lane. At least one display card is provided having preselected indicia thereon, and a generally thin profile to insert the display card between the synthetic sheet member and the base member at the insert area, such that the preselected indicia are visible through the synthetic sheet member and protected thereby as the ball rolls thereover, with the weight of the synthetic member at least in part retaining the display card in place to facilitate quick and easy insertion and removal of the display card to provide varied displays.

Another aspect of the present invention is a method for displaying indicia and the like in bowling centers, comprising providing at least one bowling lane of the type having a base member including an approach area, a pin deck area and a lane area extending between the approach area and the pin deck area. A generally transparent synthetic sheet member is provided and includes a leading end, a trailing end and a central portion. The synthetic sheet member is positioned over at least a portion of one of the approach area, the pin deck area and the lane area. The leading end of the synthetic sheet member is attached to the base member to retain the synthetic sheet member in an overlying relationship with the base member, whereby at least a portion of the synthetic sheet member is then attached to the base to define an insert area of the bowling lane. At least one display card is provided having preselected indicia thereon, and a generally thin profile. The display card is inserted between the synthetic sheet member and the base member at the insert area, such that the preselected indicia are visible through the synthetic sheet member and protected thereby, with the weight of the synthetic sheet member at least in part retaining the display card in place to facilitate quick and easy insertion and removal of the display card to provide varied displays.

Yet another aspect of the present invention is a display for bowling centers and the like, comprising at least one bowling lane of the type having a base member including an approach area, a pin deck area and a lane area extending between the approach area and the pin deck area. A generally transparent synthetic sheet member overlies at least a portion of the approach area, the pin deck area and the lane area of the base member, and includes marginal edges defining a central portion therebetween. An attachment member securely attaches at least one of the marginal edges of the synthetic sheet member to the base member to retain the synthetic sheet member in an overlying relationship with the base member, whereby at least a portion of the synthetic lane member is then attached to the base member to define an insert area of the bowling lane. At least one display card is provided having preselected indicia thereon, and a generally thin profile to insert the display card between the synthetic sheet member and the base member at the insert area, such that the preselected indicia are visible through the synthetic sheet member and protected thereby, with the weight of the synthetic sheet member at least in part retaining the display card in place to facilitate quick and easy insertion and removal of the display card to provide varied displays.

Yet another aspect of the present invention is a bowling lane, comprising a base member including an approach area, a pin deck area and a lane area extending between the approach area and the pin deck area. A generally transparent synthetic sheet member overlies at least a portion of one of the approach area, the pin deck area and the lane area of the base member, and includes marginal edges defining a central portion therebetween. An attachment member securely attaches at least one of the marginal edges of the synthetic sheet member to the base member to retain the synthetic sheet member in an overlying relationship with the base member, whereby at least a portion of the synthetic lane member is unattached to the base member to define an insert area of the bowling lane. At least one display card is provided having preselected indicia thereon, and a generally thin profile to insert the display card between the synthetic sheet member and the base member at the insert area, such that the preselected indicia are visible through the synthetic sheet member and protected thereby, with the weight of the synthetic sheet member at least in part retaining the display card in place to facilitate quick and easy insertion and removal of the display card to provide varied displays.

Yet another aspect of the present invention is a bowling lane, comprising a base having an approach area, a pin deck area, a lane area with an upper surface thereof extending between the approach area and the pin deck area, and a foul line disposed at the uplane end of the lane area. A well is disposed in the lane area of the base member a preselected spaced apart distance downlane from the foul line, and includes a substantially transparent top member disposed generally flush with the upper surface of the lane area, and an insert area disposed below the top member. At least one display is provided having preselected indicia thereon and configured to be positioned in the insert area, such that the preselected indicia are visible through the transparent top member and protected thereby.

Yet another aspect of the present invention is a bowling lane, comprising an approach area having an upper surface, and a pin deck area having an upper surface disposed substantially coplanar with the upper surface of the approach area. A recessed lane area extends between the approach area and the pin deck area, and has an upper surface thereof disposed below the upper surfaces of the approach area and the pin deck area. A programmable LED panel is supported on the recessed lane area, and has an upper surface thereof positioned substantially coplanar with the upper surfaces of the approach area and the pin deck area, and defines a playing surface over which a bowling ball is rolled from the approach area to the pin deck area.

The bowling center display and method incorporated into the present invention enhances the entertainment value of the bowling center. In one embodiment of the present invention, a plurality of differently configured display cards may be easily and quickly inserted between the synthetic sheet member and the base member at the insert area, without disassembly of the bowling lane. At least some of the display cards can be configured to define a message personal to a selected bowler to temporarily personalize the bowling lane for the selected bowler, and may include a likeness of the selected bowler. The personalized display card may be removed from the insert area and retained by the selected bowler as a souvenir. At least some of the display cards can be defined to include advertising directed to goods and/or services available for purchase at the associated bowling center. Other display cards may be configured to define training aids for the bowling lane, while yet other display cards can be used to ornament the bowling center.

These and other advantages of the invention will be further understood and appreciated by those skilled in the art by reference to the following written specification, claims and appended drawings.

DETAILED DESCRIPTION OF THE PREFERRED EMBODIMENTS

Figures 1, 2, 3:
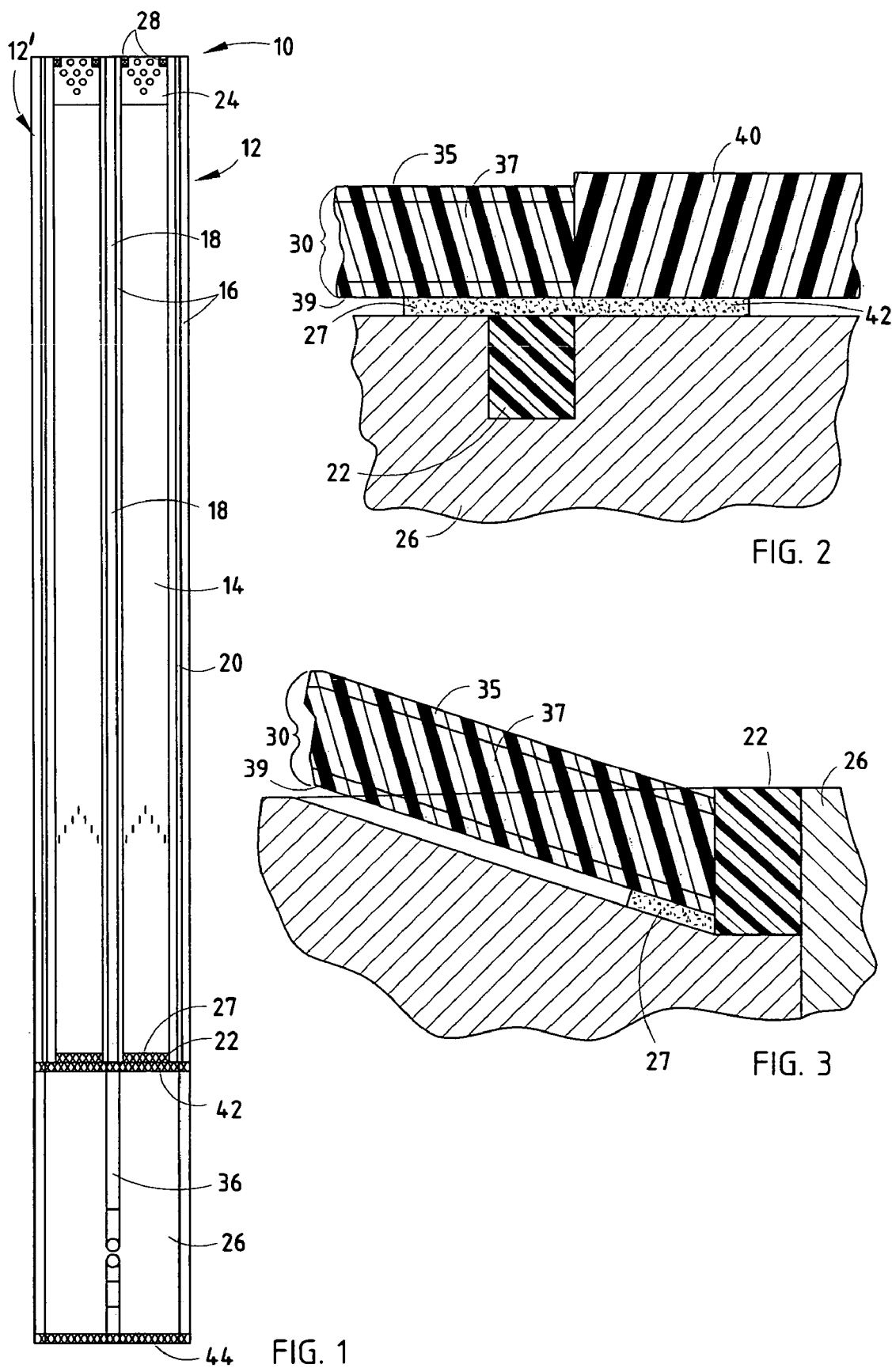
FIG. 1 is a plan view of a pair of bowling lanes, gutters, a ball return zone, approaches and pin decks embodying the present invention.
FIG. 2 is a greatly enlarged, fragmentary side elevational view of one embodiment of the junction of the approach and the lane at the foul line.
FIG. 3 is a greatly enlarged, fragmentary side elevational view of another embodiment of the juncture of the approach and the lane at the foul line.
Figure 7:
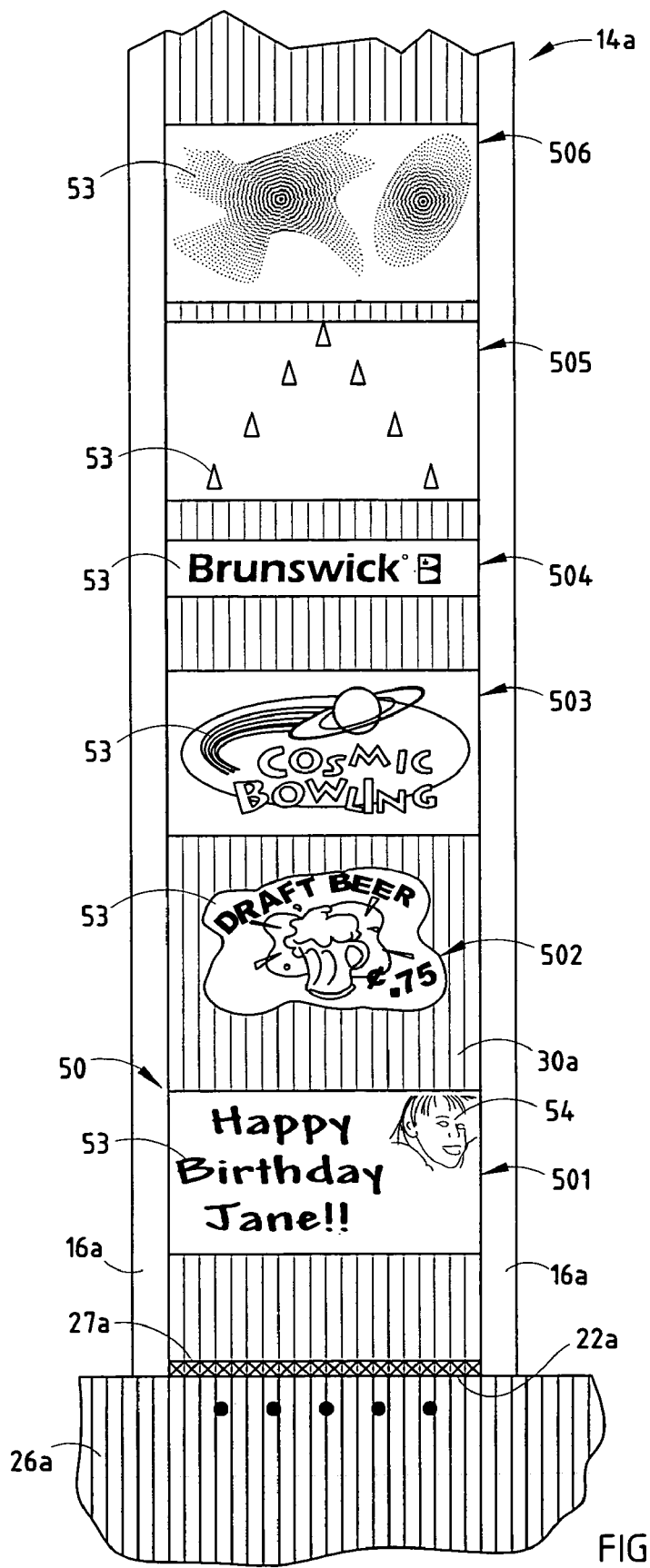
FIG. 7 is a plan view of another embodiment of the present invention, showing a bowling lane incorporating display cards positioned between a base member and the synthetic sheet member portion of the bowling lane.

For purposes of description herein, the terms "upper", "lower", "right", "left", "rear", "front", "vertical", "horizontal" and derivatives thereof shall relate to the invention as oriented in FIGS. 1 and 7. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIGS. 1–6 of the drawings, a two-lane bowling facility is shown to illustrate one embodiment of the invention, it being realized that typical bowling centers have a large number of lanes, usually in pairs like this. This two-lane arrangement 10 includes two lane assemblies 12 and 12' in a typical arrangement with each lane 14 being straddled by a pair of gutters 16. Between the two lane assemblies is a ball return capping 18 which is above a ball return channel of typical type. At opposite sides of the two lanes from the ball return capping are lane divisions 20 of typical type.

Each lane 14 is of standard length, i.e., 60 feet plus or minus ½ inch as measured from the foul line 22 to the center of the number one pin on the pin deck 24. At the head end of the lane, i.e., adjacent foul line 22, is what is known as the approach 26. The approach is where the bowler advances toward the lane with the ball in hand in order to roll or bowl the ball down the lane toward the pins on the pin deck 24. These pins are graphically illustrated as ten pins in the typical triangular configuration with number one pin being at the front apex of the triangle and numbers seven and ten pins being at the rear apices or corners of the triangle. The lane is of standard width of 41½ inches plus or minus ½ inch, according to the standards of the American Bowling Congress (ABC).

The invention shown in FIGS. 1–6 will typically be used to restore or recondition a lane which has become worn due to ball indentations, ball tracking marks, blemishes, pin indentations and general wear due to repeated traverse of the lane by balls and by a conventional lane conditioning machine. Alternatively, the invention can be used to complete, i.e., finish off, a new lane of wood or of synthetic material, and/or used in the other manners disclosed herein. If the lane is a worn lane, it is preferably sanded to remove ball dents and other cosmetic problems before the material of this invention is installed, and preferably a wood lane has a slightly rubbery base coat lane finish applied to it to seal the wood, which prevents liquids from wicking between the sheet and lane. If the lane is in good condition, the material of this invention can be installed on top of the existing wood lane finish or the synthetic lane. One variation is to sand and apply base coat only to the approximately first one third of the lane from the approach since this is where most ball damage occurs. Then, the novel sheet material is applied to the lane. If it is later decided to recondition the entire length of the lane, the novel material and lane protection layer can be readily removed from the lane, the lane reconditioned, and the novel sheet material replaced over the length of the lane.

In contrast to the prior teachings wherein a very thin film, e.g., about 0.076 to 0.178 mm (3 to 7 mils), having an adhesive over its lower surface, is carefully unrolled and adhered over the length of the lane, the present sheet is of substantial thickness of about 0.63 to 2.50 millimeters (mm), preferably 1.25 mm thick, and is not coated with adhesive. In the depicted embodiment of FIG. 1, the extruded polymer sheet 30, preferably made of polycarbonate, extends over the length of the lane from the foul line 22 to the rear edge of the pin deck 24. However, the extruded polymer sheet may cover the approach, the lane and the pin deck or any one of these areas individually or in combination. One or more sheets may be used.

In the typical instance, the polymer sheet 30 (FIGS. 1–6) extends from the foul line 22 to the rear edge of the pin deck 24. The polymer sheet is not typically glued to the entire lane. Rather, the foul line end portion of the sheet is attached by an adhesive means or any type of mechanical adhesive means, and the central area of the lane remains free of adhesive. Preferably, the adhesive is a narrow strip of thin, double-sided adhesive tape 27, preferably about 0.1 mm thick, extends substantially the width of the lane, and is positioned between extruded polymer sheet 30 and the lane surface, i.e., beneath the sheet and on top of the lane surface. The polymer sheet 30 is preferably relatively stiff when flat. This leading edge is what primarily holds the sheet in position. However, static forces also assist in retaining the polymer sheet 30 in position, especially over the central area of the lane. At the far end of the lane, i.e., at the rear of pin deck 24, the polymer sheet 30 may be secured to the underlying lane surface by a pair of laterally spaced strips of thin double-sided adhesive tape 28 (FIG. 1). It is presently preferred to have these strips of tape basically at the corners, i.e., adjacent the number seven and number ten pin locations. The double-sided tape 27 at the foul line is preferably about two inches wide. The double-sided tape at 28 preferably is in pieces of about two inches wide by four inches long in dimension, both being very thin, preferably about 0.1 mm thick. The polymer sheet 30 may be a substantially clear sheet made of 100 percent polycarbonate.

In another embodiment of the invention shown in FIGS. 1–6, the extruded polymer sheet 30 may also comprise a first layer 35 and a second layer 37 underlying first layer 35. First and second layers 35 and 37 are preferably co-extruded. The extruded polymer sheet 30 is clear, i.e., generally transparent, when polycarbonate is used to form the extruded polymer sheet. The extruded polymer sheet may be provided with selected decorative effects underneath it. These decorative materials can be inserted as a film or web and removed at will since the polymer sheet is not glued or otherwise attached to the lane over its length. The decorative effects or advertising material may also be printed on or under the polymer sheet. Thus, for example, the undersurface material can have a simulated wood appearance, advertising material, or any suitable design or wording to suit special occasions or environments. The second layer 37 can include in its thickness a coloring agent, an ultraviolet light blocker material, and/or an ultraviolet responsive pigment or dye material that is responsive to ultraviolet light to provide a special glow-in-the-dark effect similar to that described in U.S. Pat.

Nos. 5,489,241; 5,529,541 and 5,888,142, the disclosures of which are incorporated herein by reference. Incorporation of the ultraviolet responsive material into the second layer is advantageous because, should scratches occur in the first layer, this will not adversely affect the ultraviolet lighting characteristics of the lanes. Nevertheless, the ultraviolet responsive material could alternatively be incorporated into the first layer.

The first layer 35 may comprise between about 5–20 percent of a lubricious polymeric material, i.e., Teflon® (tetrafluoroethylene fluorocarbon, fluorinated ethylene-propylene, or copolymers thereof), and correspondingly 80–95 percent polycarbonate instead of being 100 percent polycarbonate material. When this is done, the thickness of the first polycarbonate layer is about 5–50 percent of the total thickness of the extruded polymer sheet. An extruded layer of Teflon®/polycarbonate can be made by feeding beads, which are each made of 5–20 percent Teflon® and correspondingly 80–95 percent polycarbonate, into the extruder.

According to another embodiment of the invention shown in FIGS. 1–7, the extruded polymer sheet 30 is composed of three laminated layers underlying one another including, a first polycarbonate layer, which is generally clear and may optionally include a lubricious polymeric material such as Teflon® and/or an optical brightener, a second polycarbonate layer that is generally clear and contains an ultraviolet responsive pigment or dye, a color tint material, and an ultraviolet light blocker material, and a third polycarbonate layer, which also is generally clear. The third layer may contain an ultraviolet light blocking agent to protect the lane from fading, a color tint material, an optical brightening material, and/or an ultraviolet light blocker alone or in any combination. Preferably, the first, second, and third layers are co-extruded. Due to the co-extrusion, the first, second and third layers do not necessarily form discrete layers.

The use of Teflon® in combination with polycarbonate in the first layer of the extruded polymer sheet reduces friction on the lane and creates a slight white color. When Teflon® is added to the first layer, however, the coefficient of friction of the upper surface of the sheet material is comparable to that of an oiled lane surface. The slight white color of the Teflon(®/polycarbonate first layer is an advantage because it brightens the bowling lane under normal lighting conditions. Bowlers find bright lanes more appealing. The Teflon(©/ polycarbonate first layer also typically creates a bowling surface with better texture. When Teflon® is incorporated into the first or only layer, the extruded polymer layer is less glossy and has a generally matte appearance, making a matte finish treatment unnecessary. When Teflon® is incorporated into the first layer, except for the relative thickness changes discussed above, the composition of the second and third polycarbonate layers, when used, remains as discussed above. Whether or not Teflon® is used as a component in the first layer, the first or second polycarbonate layers may contain ultraviolet responsive pigments or dyes. The ultraviolet responsive pigment or dye may be a fluorescent glow-in-the-dark material that may have a slightly brown appearance under normal lighting conditions, or it may be clear with no visible coloration under normal lighting conditions. Of course, any combination of glow-in-the-dark ultraviolet responsive pigments or dyes may be used or the pigment or dye may be omitted entirely from the second polycarbonate layer in both embodiments. Likewise, as discussed above, the third layer may contain an ultraviolet light blocker, which protects the wood surface of the lane from becoming damaged.

As discussed previously, the polymer sheet 30 may be substantially clear 100 percent polycarbonate only. The approach 26 (FIGS. 1–6) may or may not have a polymer sheet 30 applied. If it is applied, preferably the polymer sheet 40 (FIG. 2) on the approach 26 will be at least as thick and preferably slightly thicker than polymer sheet 30 on the lane 14, so as not to interfere with the sliding action of the bowler. For example purposes only, if polymer sheet 30 is 1.25 mm thick, polymer sheet 40 is preferably between 1.5 and 2.0 mm thick up to the foul line 22 (FIG. 2). Since this approach polymer sheet 40 is traversed by the bowler who also slides on it, it has its forward edge adjacent the foul line secured by a thin layer of adhesive of double-sided adhesive tape 42 extending across the entire width of the approach layer 40, and at the rear edge of the approach, a layer 44 of thin double-sided adhesive tape extends the width of the approach. The double-sided tape at 42 and 44 is very thin, about 0.1 mm thick, and preferably about 2–3 inches wide. The double-sided adhesive tape contains a removable protective strip 29 over the adhesive on one side of the tape prior to attachment. Optionally, a fill-in strip 36 of polymeric material can be utilized between the approach sheets 40 of the adjacent lanes (FIG. 1).

The polymer sheet 30 shown in FIGS. 1–6 may be formed on a polymer extruder having a die orifice of selected width and height to produce the width and thickness of the polymer sheet 30. Preferably, a removable protective film is applied to at least one surface of polymer sheet 30 after the polymer is extruded. Polymer sheet 30 is then transported to the bowling establishment. Sheet 40 may be formed in the same or a similar way.

When installing the polymer sheet 30 on the bowling lane, a roll of polymer sheet 30 is typically used. Once the lane has been prepared, if necessary, by sanding the base coat finishing the existing lane surface, the roll of polymer sheet 30 is laid down on the bowling lane and unrolled over the area to be covered. Once unrolled, the protective film/layer may be removed from extruded polymer sheet 30 prior to installation. Unrolling the sheet and/or removing the protective film creates a static charge that attracts particles to the bottom surface of sheet 30. Typically, any remaining dust or other small particles on the lane surface adhere to the polymer sheet 30 due to the static forces. If this occurs, the sheet 30 may be inverted (flipped over). This exposes the particles attached to the polymer sheet 30 by the static forces such that they may be removed with a towel.

In order to easily flip the polymer sheet 30, the pin deck end of the polymer sheet is pulled over the polymer sheet until it lies on the approach 26. Then, the looped end is grasped and pulled onto the approach 26. There are now four polymer sheet sections overlying one another. Next, the bottom layer of the polymer sheet 30 is pulled out from the looped end (now located about 15 feet down the lane). When the installer approaches the pin deck end 24, the polymer sheet 30 will flop over itself. The material may then be positioned as needed.

If the sheet 40 is not used on the approach area 26, then the leading edge of the sheet material at the foul line 22 is laid after the underlying wood is beveled, e.g., about 1.5 mm deep at the foul line, for a sheet material of 1.25 mm in thickness, angling up to the rest of the lane surface in 6 inch distance or so as depicted in FIG. 3. This is to assure that polymer sheet 30 will not extend above the level of the approach so as to inhibit the bowler's sliding action in the event the bowler slides across the foul line. The sheet 30 is then slid, as necessary, until one end is adjacent the foul line 22 and the opposite end is at the far end of the pin deck 24.

The top surface is preferably then cleaned with a slightly damp, lint-free towel bar or the like. This removes any dirt and dust from the polymeric sheet 30 and should especially be done if the sheet has been inverted to expose dust or other particles that were on the lane, but that adhered to the sheet due to static forces, as discussed above.

Once the polymer sheet 30 is positioned so that it is straight and covers the entire lane surface, it can be temporarily attached to the lane with a few pieces of double-sided tape. It may be permanently attached. Then, a cutting tool of the type commonly used for cutting polymers is preferably employed to trim the side edges of the polymer sheet 30 so that the width of the sheet is equal to or slightly less than the underlying lane width. Preferably, the edges are about 0.1 mm or so less width than the lane, on each side of the lane but within the ABC guidelines. Then the front and back ends are trimmed to the proper length, if necessary. Preferably, the top surface of the sheet 30 is then buffed slightly as with a rotary floor machine, at least for the first approximately 30–45 feet of the lane. The cut edges are then smoothed and typically beveled.

After the surface of the extruded polymer sheet 30 is cleaned as necessary, it is attached at the foul line 22 with the double-sided tape 27 about 2 inches (50.8 mm) wide and about 0.1 mm thick over the width of the material. Two pieces of two inch (50.8 mm) wide tape may also be used. For ease of installation, the double-sided tape should be attached to the lane first. It may be desired not to further secure the rear end of the polymer sheet 30 at the pin deck 24 until the lane has been used and/or conditioned with a common bowling lane conditioner a few times to assure that it lies completely flat. Ultimately, the rear end of the polymer sheet 30 is preferably attached to the underlying lane surface by a pair of approximately two inch (50.8 mm) by four inch (101.6 mm) pieces of double-sided tape 28 at the rear corners of the pin deck. The sheet material can be buffed periodically to assure uniformity of surface characteristics. With these simple steps completed, the sheet material has been found by extensive testing to be suitable for extended bowling.

The upper surface of polymer sheet 30 can be smooth or have a matte finish. As discussed above, when no Teflon® is incorporated into the polycarbonate layer, treatment may be necessary to obtain a matte finish, while no such treatment is necessary when Teflon® is used because the reconditioning layer is less glossy. If at any time it is desired to remove the polymer sheet 30 for treatment of the lane in any fashion, or applying decorative surfaces or the like beneath it, this can be readily done by simply releasing the double-sided tape at the ends and shifting the polymer sheet 30 off the lane.

Installation of the extruded polymer sheet 40 shown in FIGS. 1–6 on the approach is done in similar fashion except that the entire width of the sheet 40 on the approach has the double-sided tape 42 on both the edge portion adjacent the foul line and at 44 on the leading edge portion, as depicted in FIG. 1.

Figure 4:
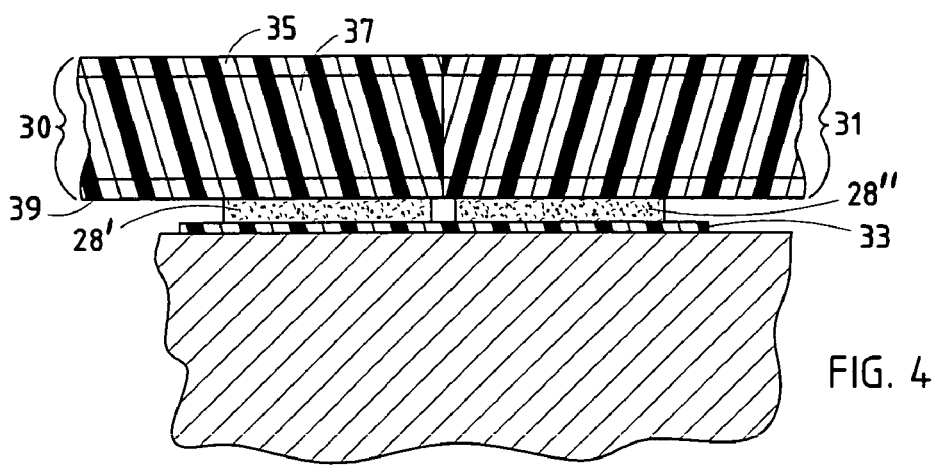
FIG. 4 is a greatly enlarged, fragmentary side elevational view of an embodiment of the juncture at the lane and the pin deck.
Figure 5:
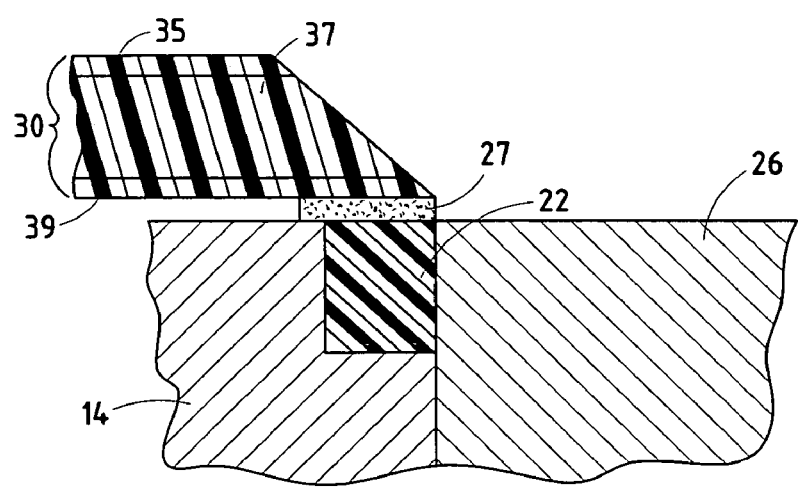
FIG. 5 is a greatly enlarged, fragmentary side elevational view of an embodiment showing a synthetic sheet member on a lane and without applying an extruded layer on the approach.
Figure 6:
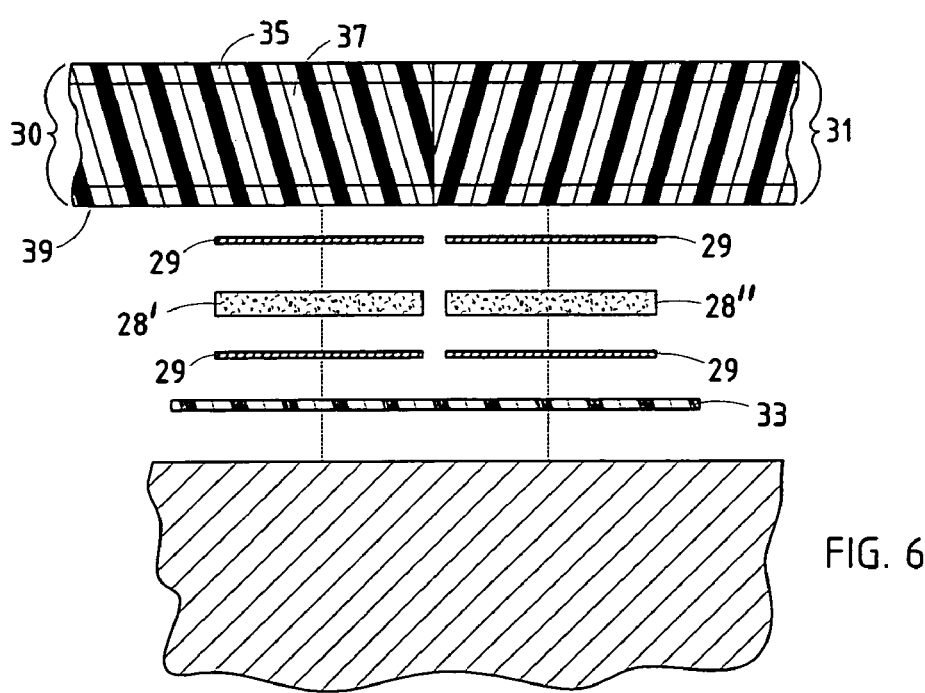
FIG. 6 is a greatly enlarged, exploded side elevational view of an embodiment of the juncture at the lane and the pin deck.

If it is desired to have a separate layer of material on the pin deck 24, this can be done in the manner indicated in FIG. 4 by having polymer sheet 30 terminate at the front of the pin deck 24, applying a separate layer 31 on the pin deck, there being underlying double-sided tape 28' beneath the rear edge of polymer layer 30, and tape 28' beneath the forward edge of layer 31, adjacent to each other, and a very thin layer of clear plastic film 33, e.g., about 0.005 inch (0.127 mm) thick, beneath both of these strips to tape. The tape may have an adhesive protective strip 29 on both sides (FIG. 6). However, typically the adhesive tape has a single top protective strip, and the adhesive is rolled onto the surface when applied. Once unrolled, the top protective strip 29 is removed to reveal the adhesive. Additionally, if there is another section of the lane, e.g., the head section, which is damaged, it can be cut out and replaced with material of appropriate length. A separate piece of a very thin clear plastic, with adhesive on one side, may also be used to adhere the sheet to the lane, as disclosed in U.S. Pat. No. 4,795,152.

Also, a lubricious polymeric material containing lane finishing material may be applied as a lane finish directly to any portion of the surface of the lane, the pin deck or to the polymer sheet.

The reference numeral 14a (FIGS. 7–16) generally designates yet another embodiment of the present invention, having at least one display card 50. Since bowling lane 14a is similar to the previously described bowling lane 14, similar parts appearing in FIGS. 1–6 and 7–16 respectively are represented by the same, corresponding reference numeral, except for the suffix "a" in the numerals of the latter. Because the polymer or synthetic sheet member 30a is not attached to the base 51 of bowling lane 14a intermediate its opposite ends, an insert area 52 is defined between the upper surface of base member 51, and the lower surface of synthetic sheet member 30a. In the example illustrated in FIGS. 7–16, display card 50 has preselected indicia 53 thereon, and a generally thin profile to facilitate inserting display card 50 between synthetic sheet member 30a and base member 51 at the insert area 52 of bowling lane 14a, such that the preselected indicia 53 are visible through synthetic sheet member 30a and protected thereby as the bowling ball rolls thereover, with the weight of the synthetic sheet member 30a at least in part retaining the display card 50 in place to facilitate quick and easy insertion and removal of the display card 50 to provide varied displays. Display card 50 has a thin profile having a thickness of 0.63–1.25 mm, for example.

In the examples illustrated in FIGS. 7–16, a plurality of display cards 50 are provided, each having different preselected indicia thereon, as described in greater detail below. Each display card 50 is configured for manual insertion between synthetic sheet member 30a and base member 51 at the insert area 52, and manual removal therefrom without disassembly of bowling lane 14a. As noted above, synthetic sheet member 30a typically carries a static electrical charge, which draws the synthetic sheet member 30a toward the base member 51 to at least in part securely retain the display cards 50 at preselected positions between the base member 51 and synthetic sheet member 30a without separate fasteners.

Figure 15:
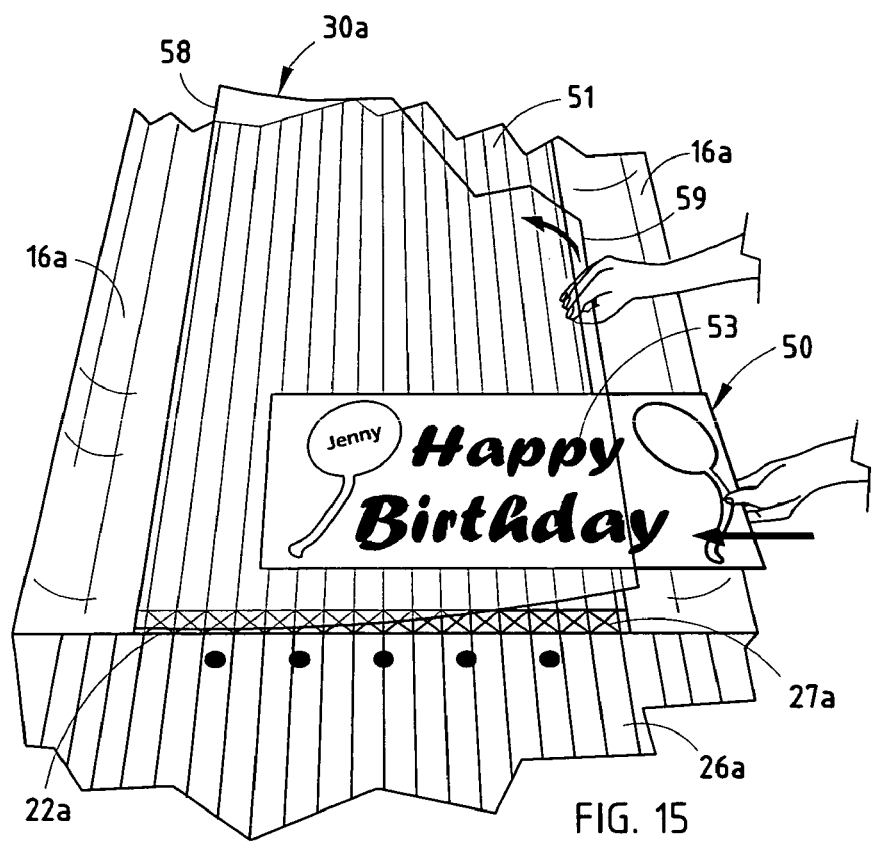
FIG. 15 is a perspective view of the invention shown in FIG. 7, wherein the synthetic sheet member has been raised along one side thereof to facilitate insertion of a display card.
Figure 16:
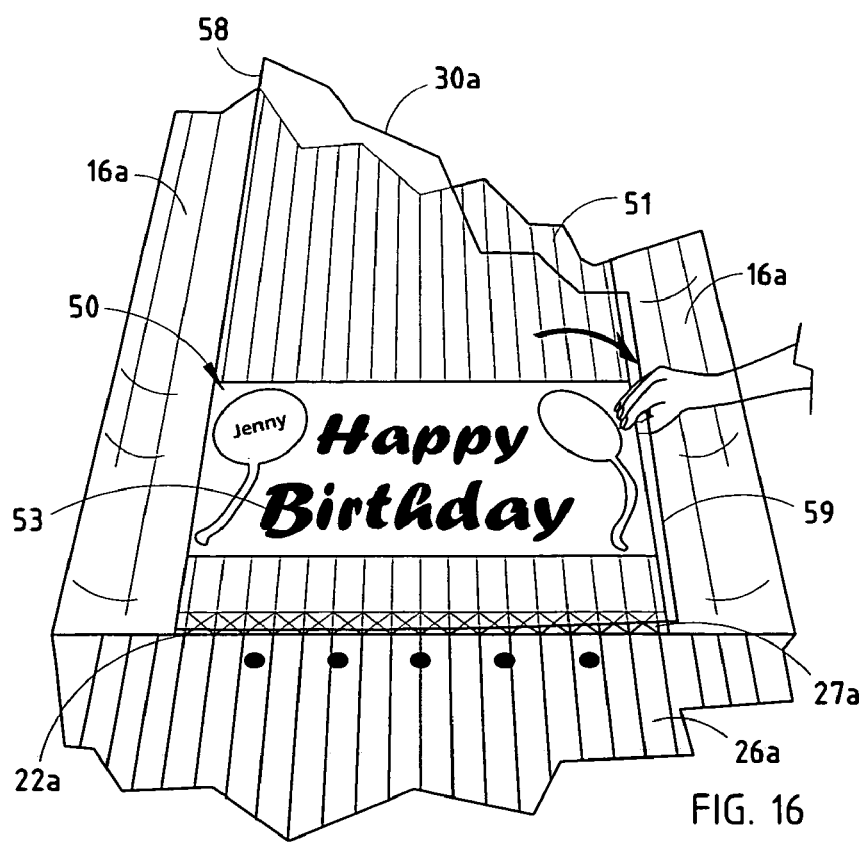
FIG. 16 is a perspective view of the invention shown in FIG. 7, wherein the display card has been positioned in place on the lane, and the synthetic sheet member is being lowered to cover the same.

As best illustrated in FIGS. 15 and 16, synthetic sheet member 30a includes opposite side edges 58 and 59 extending along opposite sides of synthetic sheet member 30a. At least one of the side edges 58 and 59 is configured to be manually grasped and lifted upwardly to facilitate insertion and removal of the display cards 50 from between synthetic sheet member 30a and base member 51 at insert area 52. In the illustrated example, display cards 50 can be inserted and removed from insert area 52 from along both side edges 58 and 59 of synthetic sheet member 30a. In the example shown in FIG. 7, insert area 52 extends along the entire length of lane 14a, and is therefore configured to simultaneously receive and retain therein a plurality of display cards 50. Each display card 50 is positioned directly on the flat upper surface of base member 51 for abutting support thereon.

Figure 8:
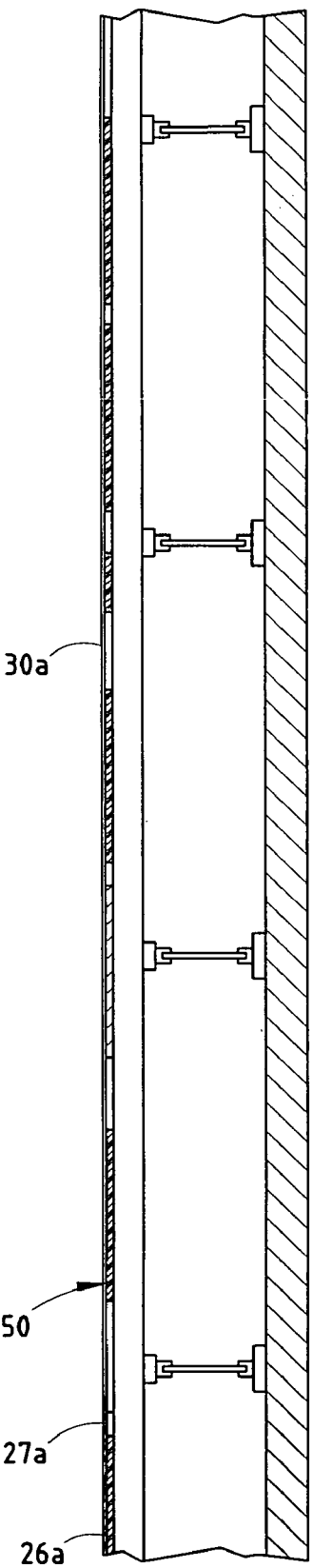
FIG. 8 is a vertical cross-sectional view of the bowling lane shown in FIG. 7.

As best illustrated in FIGS. 7 and 8, display cards 50 may be provided with a wide variety of different indicia to create messages and/or ornament the interior of the bowling center. For example, the indicia 53 associated with display card 501 include a message personal to a selected bowler to temporarily personalize the bowling lane 14a for the selected bowler. In the illustrated example, display card 501 bears the indicia "Happy Birthday Jane!!" to announce the celebration of the birthday of a person named Jane. Furthermore, in the illustrated example, display card 501 also includes the likeliness 54 of the selected bowler. When the celebration is finished, display card 501 may be removed from insert area 52 and retained by the selected bower as a souvenir, and may be signed by the celebration participants.

The indicia 53 associated with display card 502 (FIGS. 7 and 8) include the phrase "Draft Beer", an illustration of a beverage and the associated sales price to advertise goods and/or services available for purchase at the associated bowling center. Since display card 502 can be readily inserted and removed from insert area 52, the associated advertising can be quickly and easily changed to reflect daily specials or the like. As will be apparent to one having ordinary skill in the art, a variety of different advertisements can be incorporated into display card 502.

The indicia 53 associated with display card 503 (FIGS. 7 and 8) are also a form of advertising, but are directed to a particular brand of glow-in-the-dark bowling services offered by the bowling center. The indicia 53 associated with display card 504 are also advertising, but are directed to the manufacturer of the bowling center equipment. The indicia 53 incorporated into display card 505 are in the form of a training aid, such as downlane markings, to assist the bowler in directing the ball toward the bowling pins. The indicia 53 associated with display card 506 incorporate designs that serve to ornament the interior of the bowling center.

Display cards 50 may be provided in a wide variety of different shapes and sizes, and can be manufactured using many different materials and/or processes. In the examples illustrated in FIGS. 7 and 8, display cards 501, 503, 505 and 506 each have a generally rectangular top plan configuration, with a width that is substantially coextensive with the width of synthetic sheet member 30a. In contrast, insert card 502 has a free-formed perimeter, with a width that is substantially less than the width of synthetic sheet member 30a. Display cards 50 may also be provided in other different shapes and sizes. In the embodiment illustrated in FIGS. 7–16, it is particularly beneficial that the width of the display cards 50 be sufficient that the installer can easily grasp the side edge of the display card 50 when the synthetic sheet member 30a has been lifted to remove the same and/or replace the display card with another display card.

Figure 9:
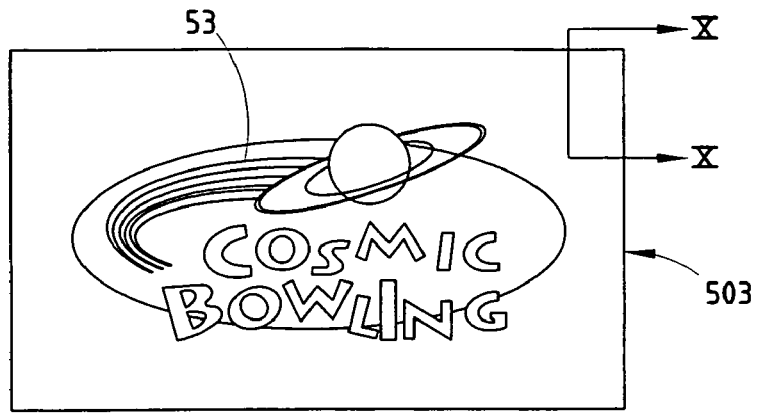
FIG. 9 is a top plan view of a first insert card bearing advertising relating to services offered the bowling center.
Figure 10:
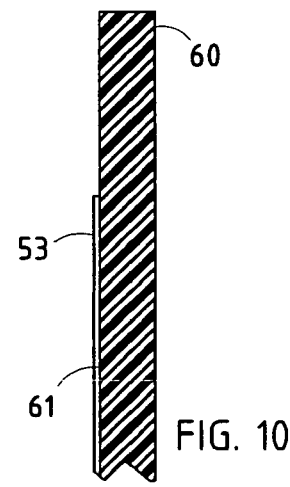
FIG. 10 is a fragmentary, vertical cross-sectional view of the first display card, taken along the line X—X, FIG. 9.

With reference to FIGS. 9 and 10, the illustrated display card 503 is made from a relatively thin panel 60 of clear or transparent plastic, with indicia 53 formed on the upper surface thereof by an ink layer 61 printed thereon by any one of a number of different suitable processes. Because panel 60 is transparent, the board pattern of bowling lane 14a appears through the unpainted portion of display panel 503 to present a very attractive, colorful design that appears to be permanently embedded in bowling lane 14a, but is in actuality readily removable and replaceable with another display card 50.

Figure 11:
FIG. 11 is a top plan view of a second display card bearing advertising for goods available for purchase at the bowling center.
Figure 12:
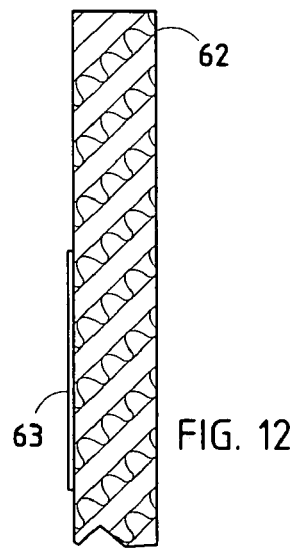
FIG. 12 is a fragmentary, vertical cross-sectional view of the second display card, taken along the line XII—XII, FIG. 11.

With reference to FIGS. 11 and 12, display card 502 is manufactured from a sheet 62 of paper, thin cardboard or other cellulose based material. Indicia 53 are printed on the upper surface of sheet 62 using a thin ink layer 63, which can be manually painted thereon, or applied in any one of a different number of suitable processes, such as printing or the like.

Figure 13:
FIG. 13 is a plan view of a third display card bearing the likeness and a personalized greeting for a preselected bowler.
Figure 14:
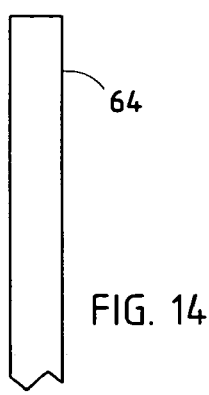
FIG. 14 is a fragmentary, vertical cross-sectional view of the third display card, taken along the line XIV—XIV, FIG. 13.

With reference to FIGS. 13 and 14, the illustrated display card 502 includes computer generated indicia 53, along with a digital photograph image 54, which are formed on a paper sheet 64 by a computer printer or the like, such that the indicia 53 does not add any substantial thickness to the display card 502.

Display cards 50 may also include thin pressure actuated switches (not shown) such as those disclosed in U.S. Pat. No. 6,578,291, which are actuated by the weight of a bowling ball as it rolls over the switch. The switches can be used to activate lighting, or integrated with programmable games, as disclosed in greater detail hereinafter. For example, the arrow-shaped indicia 53 associated with display card 505 may incorporate a pressure actuated switch and associated light, such that as the bowling ball rolls over one of the arrows, it is illuminated to provide the bowler with a visual indication and reminder as to the travel line of the ball.

Figure 17:
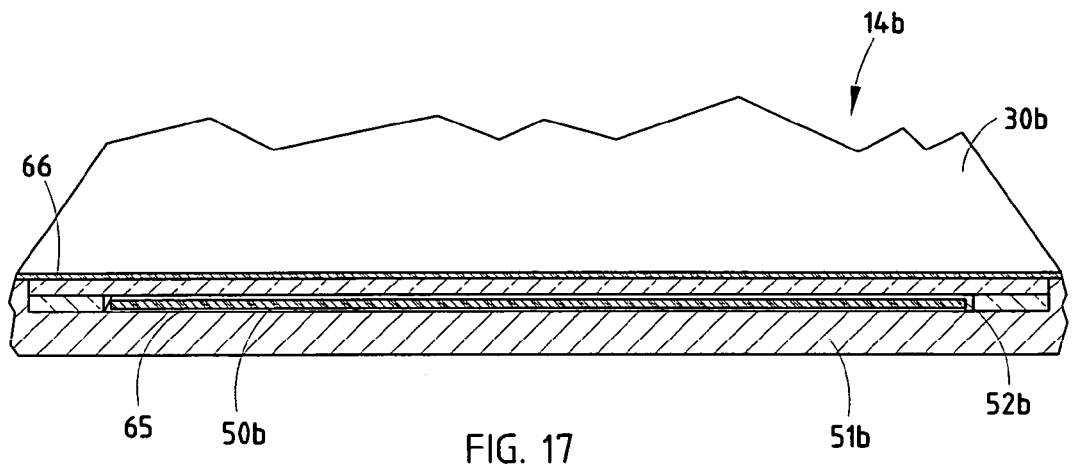
FIG. 17 is a cross-sectional view of yet another embodiment of the present invention, taken along the line XVII—XVII, FIG. 18, and having a bowling lane that incorporates a well to receive a display therein.
Figure 18:
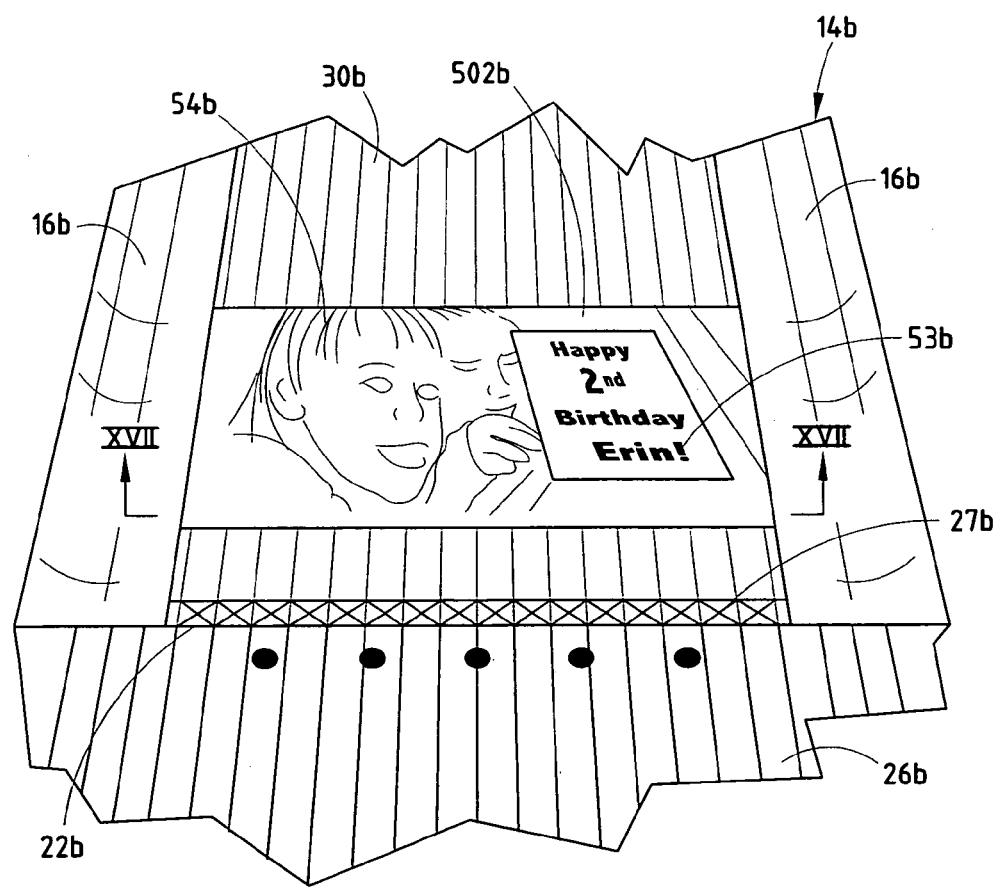
FIG. 18 is a perspective view of the bowling lane shown in FIG. 17.
Figure 19:
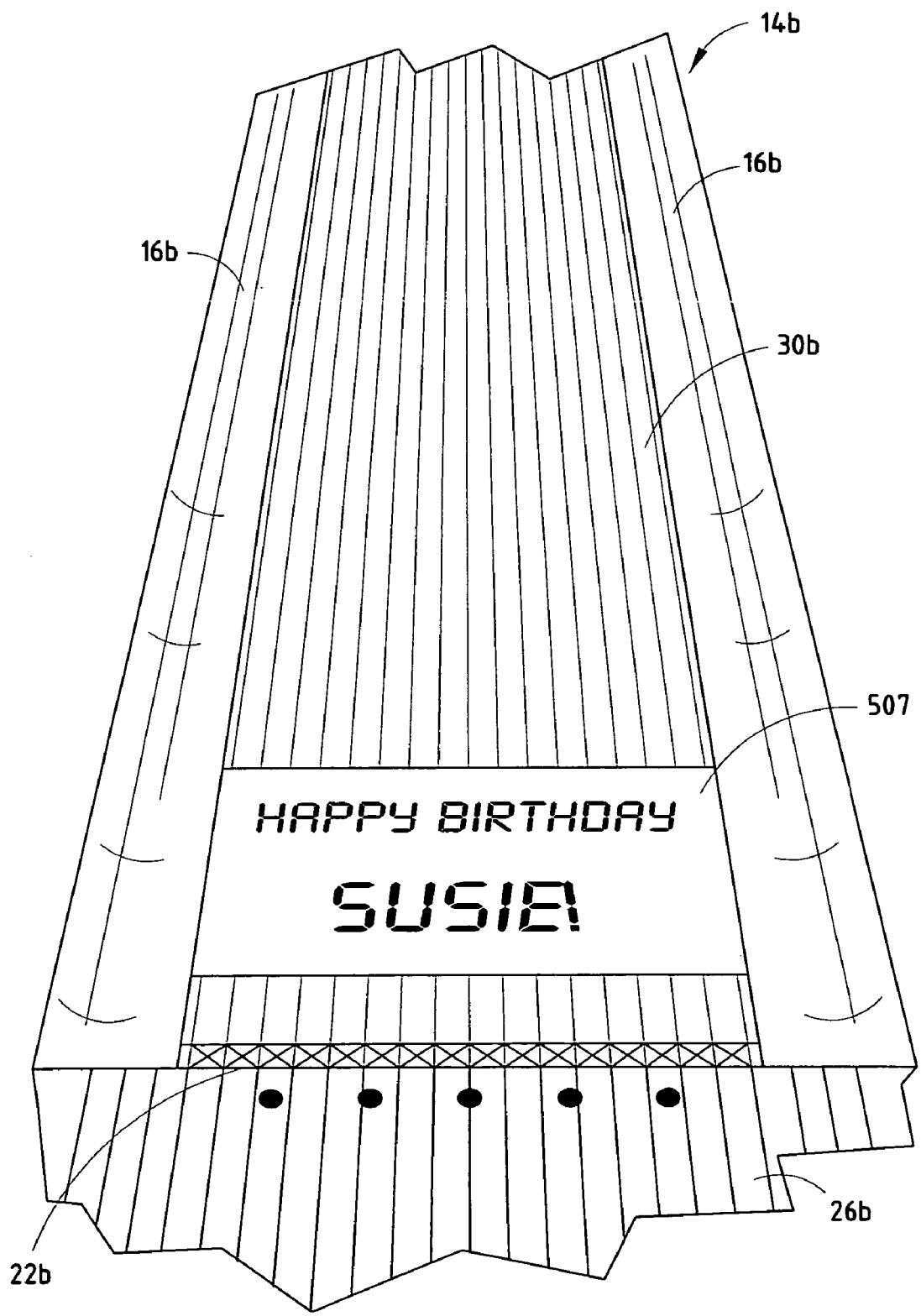
FIG. 19 is a perspective view of the bowling lane shown in FIG. 17, with a programmable LED panel positioned in the well.

The reference numeral 14b (FIGS. 17 and 18) generally designates yet another embodiment of the present invention, having a recess or well 65 to receive display cards 50b therein. Since bowling lane 14b is similar to the previously described bowling lane 14a, similar parts appearing in FIGS. 17–19 and FIGS. 7–16 respectively are represented by the same, corresponding reference numeral, except for the suffix "b" in the numerals of the latter. In bowling lane 14b, recess or well 65 is disposed in the base member 51b of bowling lane 14b a preselected spaced apart distance downlane from the foul line 22b, and defines the insert area 52b of bowling lane 14b. A substantially transparent top member 66 is disposed on the upper portion of well 65, over insert area 52b, and is flush with the upper surface of the bowling lane 14b. Display cards 50b, such as the display cards 501–506 shown in FIG. 7, are inserted into the insert area 52b of bowling lane 14b, and are visible through transparent top member 66 and are protected thereby. Well 65 may be constructed in a manner that permits the placement of relatively thick, more permanent displays into insert area 52b. The display cards 52b can be removed and replaced from well 65 by lifting synthetic sheet member 30b, and removing transparent top member 66. In the example shown in FIG. 19, a programmable LED panel 507 is positioned in the insert area 52b of bowling lane 14b, and can be programmed to display a wide variety of different messages.

Figure 20:
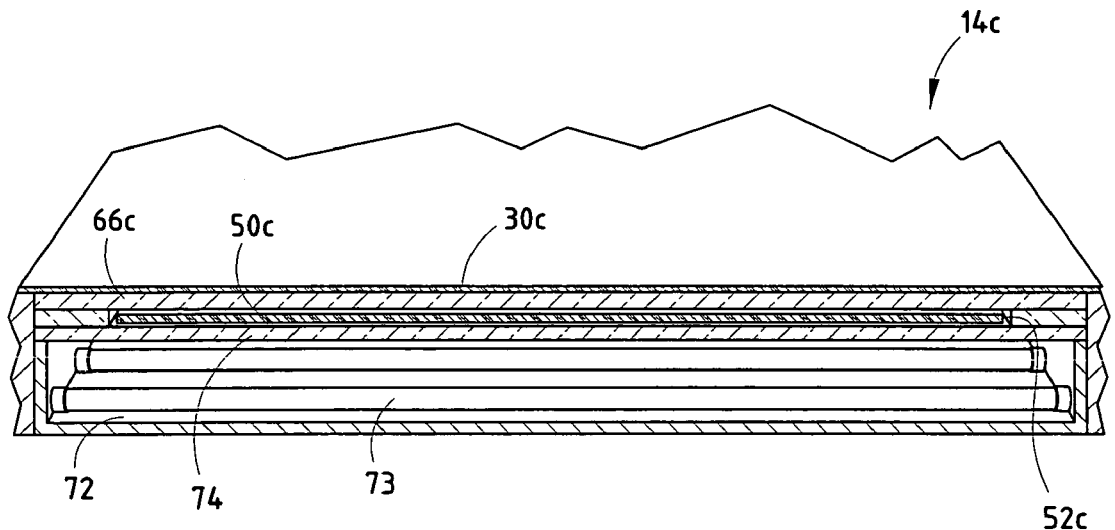
FIG. 20 is a perspective view of yet another embodiment of the present invention, having a bowling lane with a light box positioned below a well portion of the bowling lane in which a display is received.
Figure 21:
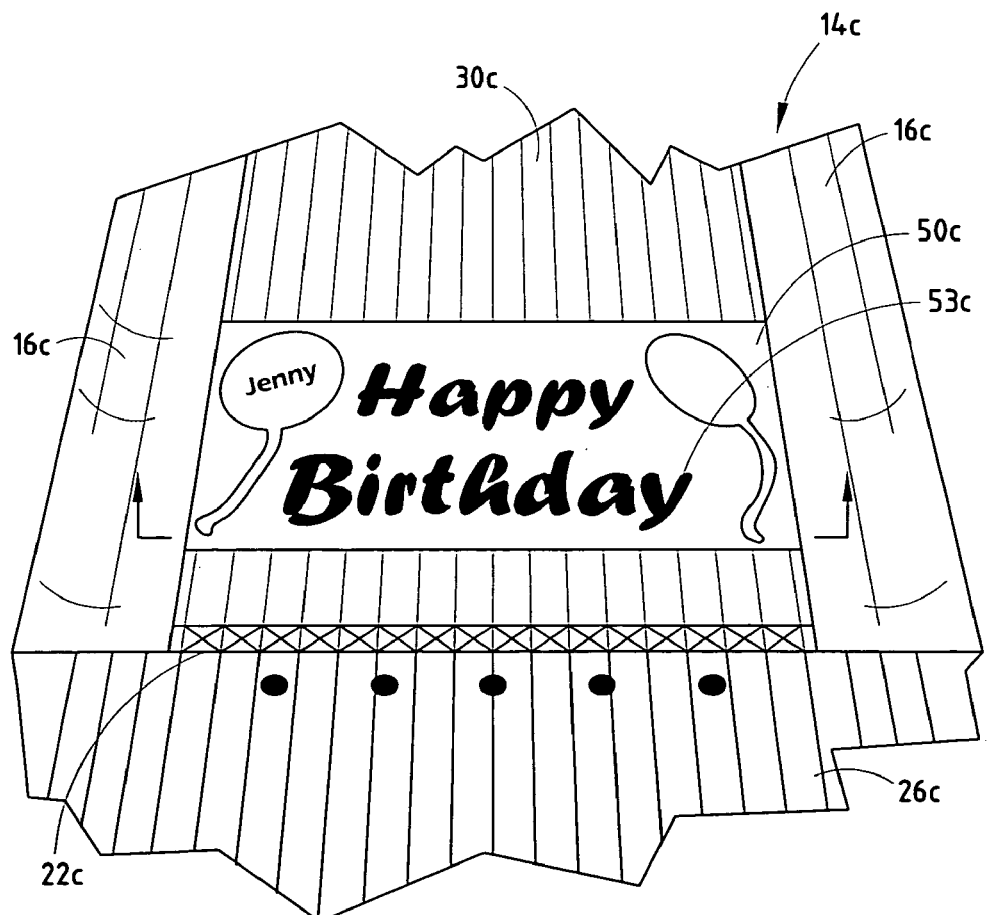
FIG. 21 is a perspective view of the bowling lane shown in FIG. 20, with a back-lit display positioned therein.
Figure 22:
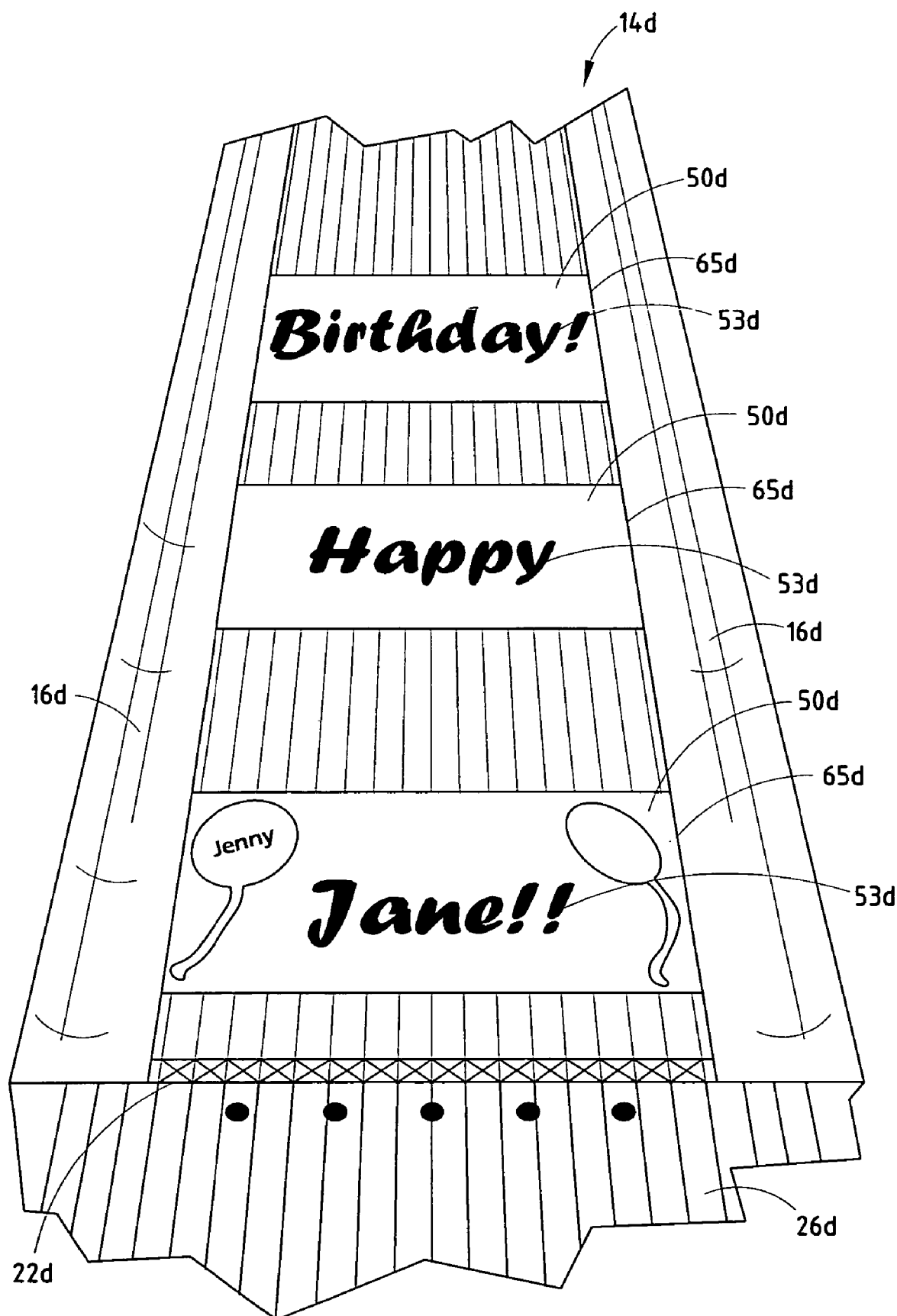
FIG. 22 is a perspective view of yet another embodiment of the present invention, which incorporates multiple wells positioned along the length of the bowling lane.

The reference numeral 14c (FIGS. 20 and 21) generally designates yet another embodiment of the present invention, having a light box 72 to back light display cards 50c. Since bowling lane 14c is similar to the previously described bowling lane 14b, similar parts appearing in FIGS. 20 and 22 and FIGS. 17–19 respectively are represented by the same, corresponding reference numeral, except for the suffix "c" in the numerals of the latter. In bowling lane 14c, light box 72 is located directly below the insert area 52c of bowling lane 14c, and includes a plurality of bulbs 73, which are illuminated to back light display cards 50c in the insert area 52c of bowling lane 14c. Light box 72 includes a substantially transparent upper panel 74, which is similar in construction to transparent top member 66c. Consequently, when bulbs 73 are illuminated, light shines through upper panel 74, and back lights the display cards 50c in insert area 52c.

The reference numeral 14d (FIG. 22) generally designates yet another embodiment of the present invention, having multiple wells 65d spaced longitudinally along the length of bowling lane 14d. Since bowling lane 14d is similar to the previously described bowling lane 14b, similar part appearing in FIG. 22 and FIGS. 17–18 respectively are represented by the same, corresponding reference numeral, except for the suffix "d" in the numerals of the latter. In bowling lane 14d, three wells 65d are spaced along the length of bowling lane 14d, preferably beginning adjacent foul line 22d for the best viewing from approach area 26d. Each of the wells 65 may be equipped with a light box (not shown) similar to that discussed above in connection with bowling lane 14c. In the illustrated example, the three display cards 50d are arranged to present a single message, which reads "Happy Birthday Jane". Display cards 50d may be removed and replaced with different display cards 50d in a manner similar to that described hereinabove relative to bowling lane 14c.

Figure 23:
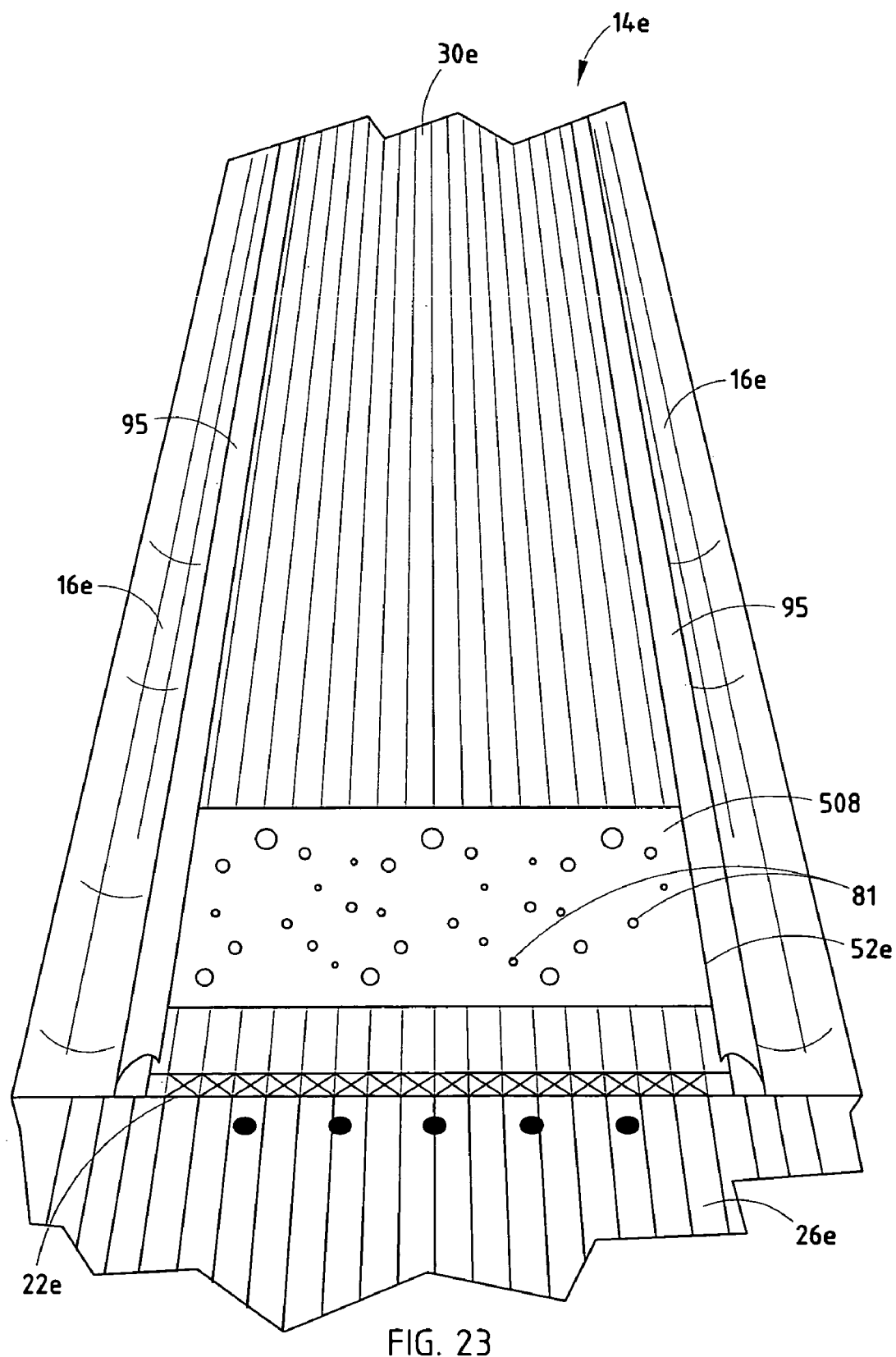
FIG. 23 is a perspective view of yet another embodiment of the present invention, wherein a game panel is inserted into a well portion of the bowling lane.
Figure 24:
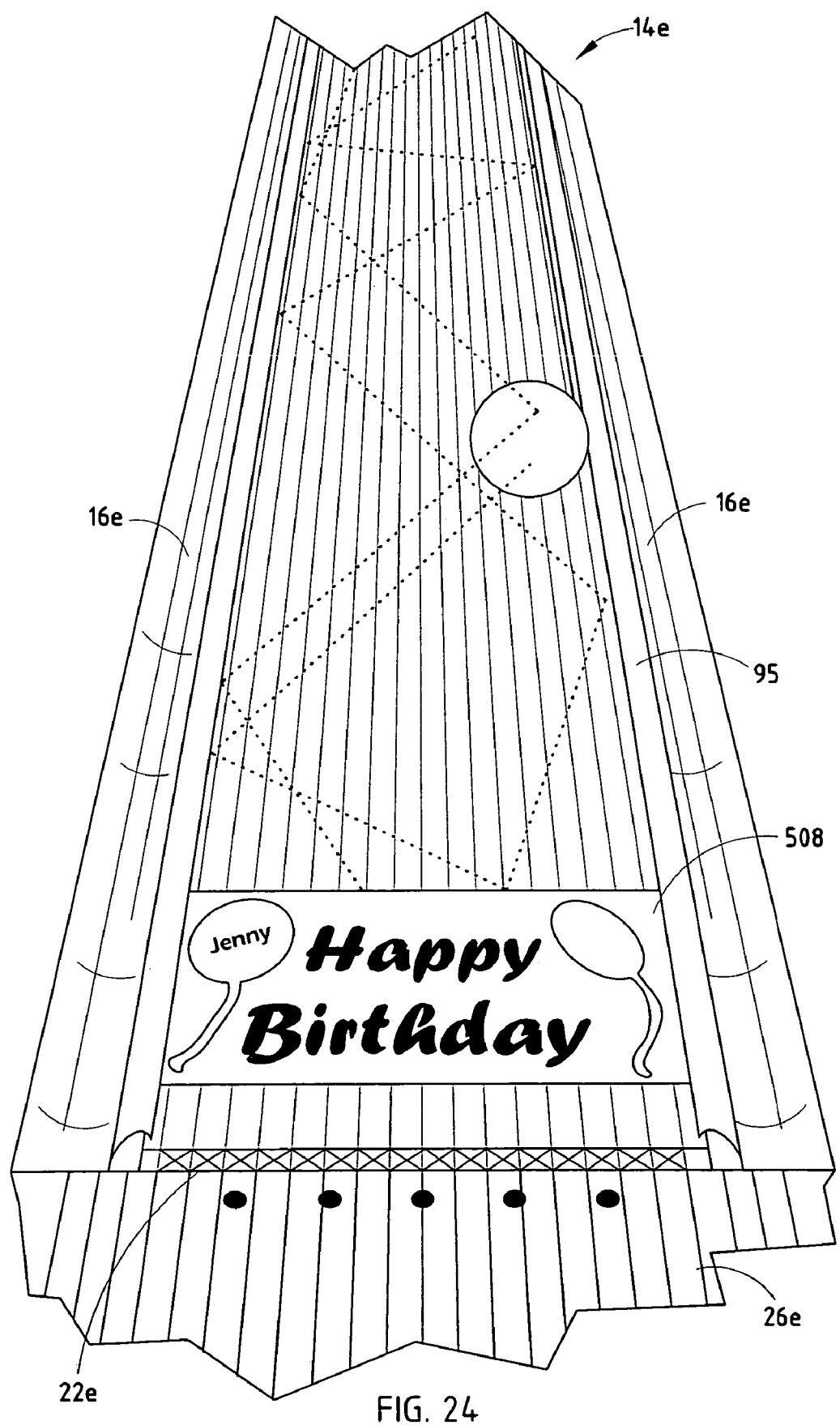
FIG. 24 is a perspective view of yet another embodiment of the present invention, which incorporates a bumper bowling game.

The reference numeral 14e (FIGS. 23 and 24) generally designates yet another embodiment of the present invention, having a programmable game panel 508 disposed in insert area 52e. Since bowling lane 14e is similar to the previously described bowling lane 14b, similar parts appearing in FIGS. 23 and 24 and FIGS. 17–18 respectively are represented by the same, corresponding reference numeral, except for the suffix "e" in the numerals of the latter. In the embodiment illustrated in FIG. 23, programmable lights 81 are incorporated into a programmable panel 508 disposed in the insert area 52e of bowling lane 14e. Preferably, lights 81 on panel 508 are programmed in correspondence to the impact of the bowling ball on the bowling pins to provide bonus scores under selected circumstances. A wide variety of different games can be programmed and played using game panel 508. In the illustrated example, bowling lane 14e is also provided with retractable bumpers 95 disposed along opposite sides of bowling lane 14e. Bumpers 95 may be incorporated into the game associated with game panel 508, and are particularly beneficial to facilitate play by children, and further enhance special occasions and events, such as birthday parties and the like. In FIG. 24, game panel 508 has been programmed to illustrate a personalized greeting for the bowler, and illustrates how bumpers 95 can be used as part of the game.

Figure 25:
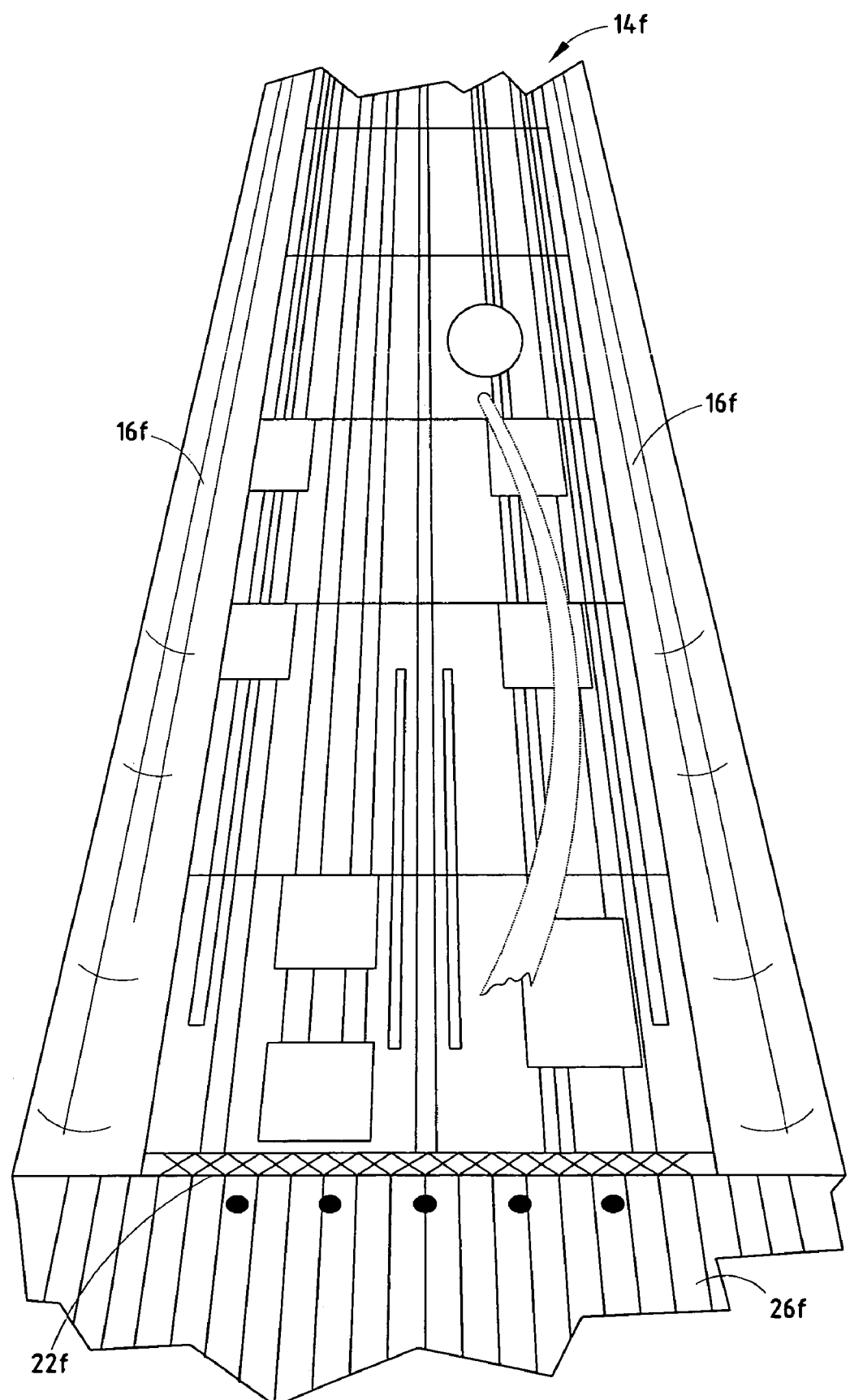
FIG. 25 is a perspective view of yet another embodiment of the present invention, which incorporates a full-length programmable LED panel over which the bowling ball is roled.

The reference numeral 14f (FIG. 25) generally designates another embodiment of the present invention, having a full-length programmable LED lane surface 100. Since bowling lane 14f is similar to the previously described bowling lane 14b, similar parts appearing in FIG. 25 and FIGS. 17–18 respectively are represented by the same, corresponding reference numeral, except for the suffix "f" in the numerals of the latter. In bowling lane 14f, the well 65f extends along the entire length of lane 14f, from foul line 22f to the pin deck 24f. A programmable LED panel 100 is supported in the well or recessed lane area, and has an upper surface thereof positioned substantially coplanar with the upper surfaces of the approach area 26f and the pin deck area 24f, and defines the playing surface over which the bowling ball is rolled from the approach area to the pin deck area. LED panel 100 can be programmed to provide messages, ornamentation, bowling training aid and/or a wide variety of other purposes.

In the foregoing description, it will be readily appreciated by those skilled in the art that modifications may be made to the invention without departing from the concepts disclosed herein. Such modifications are to be considered as included in the following claims, unless these claims by their language expressly state otherwise.

What is claimed is:

1. A display for bowling centers, comprising:
at least one bowling lane having:
a base member including an approach area thereof, a pin deck area thereof and a lane area thereof extending between said approach area and said pin deck area;
a synthetic sheet member overlying at least the lane area of said base member and including a leading end thereof disposed adjacent to said approach area, a trailing end thereof disposed adjacent to said pin deck area, and a central portion thereof disposed over said lane area; said synthetic sheet being generally transparent, and adapted to roll a bowling ball thereover;
an attachment member securely attaching the leading end of said synthetic sheet member to said base member adjacent the approach area thereof to retain said synthetic sheet member in an overlying relationship with said base member, whereby at least a portion of the central portion of said synthetic lane member is unattached to said base member to define an insert area of said bowling lane; and
at least one display card having preselected indicia thereon and a generally thin profile to insert said display card between said synthetic sheet member and said base member at said insert area, such that said preselected indicia are visible through said synthetic sheet member and protected thereby as the bowling ball rolls thereover, with the weight of said synthetic sheet member at least in part retaining said display card in place to facilitate quick and easy insertion and removal of said display card to provide varied displays.

2. A display as set forth in claim 1, including:
a plurality of said display cards, each having different preselected indicia thereon and being configured for manual insertion between said synthetic sheet member and said base member at said insert area, and manual removal therefrom without disassembly of said bowling lane.

3. A display as set forth in claim 2, wherein:
said synthetic sheet member includes a static electrical charge which draws said synthetic sheet member toward said base member to at least in part securely retain said display cards at preselected positions between said base member and said synthetic sheet member without separate fasteners.

4. A display as set forth in claim 3, wherein:
said synthetic sheet member includes opposite side edges extending longitudinally along opposite sides thereof; and
at least one of said side edges is configured to be manually grasped and lifted upwardly to facilitate insertion and removal of said display cards from between said synthetic sheet member and said base member at said insert area.

5. A display as set forth in claim 4, wherein:
both of said opposite edges of said synthetic sheet member are provided to be lifted upwardly to facilitate insertion and removal of said display cards between said synthetic sheet member and said base member at said insert area.

6. A display as set forth in claim 5, wherein:
said plurality of said display cards are simultaneously received and retained in said insert area.

7. A display as set forth in claim 6, wherein:
said base member includes a flat upper surface on which said synthetic sheet member is abuttingly supported; and said display cards are positioned directly on said flat upper surface for abutting support thereon.

8. A display as set forth in claim 7, wherein:
said preselected indicia on at least one of said display cards define a message personal to a selected bowler to temporarily personalize said bowling lane for the selected bowler.

9. A display as set forth in claim 8, wherein:
said one display card includes a likeness of the selected bowler.

10. A display as set forth in claim 9, wherein:
said preselected indicia on at least one of said display cards comprises advertising.

11. A display as set forth in claim 10, wherein:
said advertising is directed to goods or services available for purchase at the associated bowling center.

12. A display as set forth in claim 11, wherein:
said preselected indicia on at least one of said display cards define a training aid for a bowler using said bowling lane.

13. A display as set forth in claim 12, wherein:
at least one of said display cards includes a pressure activated switch which is actuated when the bowling ball rolls thereover.

14. A display as set forth in claim 13, wherein:
at least one of said display cards includes a design to ornament the bowling center.

15. A display as set forth in claim 14, wherein:
at least one of said display cards includes a game to be played on said bowling lane with the bowling ball.

16. A display as set forth in claim 15, wherein:
at least one of said display cards includes an illuminated portion.

17. A display as set forth in claim 16, wherein:
at least one of said display cards includes programmable LEDs.

18. A display as set forth in claim 17, including:
a well disposed in said base member a preselected spaced apart distance downlane from a foul line portion of said bowling lane to define said insert area, and including an upper portion positioned substantially flush with the flat upper surface of said base member, such that said synthetic sheet lies completely flat over said insert area.

19. A display as set forth in claim 18, including:
a light box disposed under said insert area of said base member and configured to back light at least a portion of one of said display cards.

20. A display as set forth in claim 19, wherein:
said light box is positioned in said well.

21. A display as set forth in claim 20, wherein:
said trailing end of said synthetic sheet is connected with said base member adjacent said pin deck area to retain said synthetic sheet member in said overlying relationship with said base member along the length of said bowling lane.

22. A display as set forth in claim 21, wherein:
said insert area and said central portion of said synthetic sheet member extend between said leading end and said trailing end of said synthetic sheet member, with said central portion being unattached to said base member, such that said base member can shift without distorting the shape of said synthetic sheet member, and said display cards can be positioned anywhere along the length of said central portion.

23. A display as set forth in claim 22, wherein:
said upper support surface of said base member is constructed primarily of wood.

24. A display as set forth in claim 23, wherein:
said synthetic sheet member has a predetermined width defined between said opposite side edges thereof; and
said display cards each have a preselected width that is less than the predetermined width of said synthetic sheet member.

25. A display as set forth in claim 24, wherein:
said synthetic sheet member comprises a single, continuous polymer sheet.

26. A display as set forth in claim 25, wherein:
said polymer sheet has a thickness in the range of 0.63 to 2.5 mm.

27. A display as set forth in claim 26, wherein:
said polymer sheet comprises a mixture of lubricious polymeric material and polycarbonate.

28. A display as set forth in claim 27, wherein:
said display cards each have a thickness in the range of 0.63 to 1.25 mm.

29. A display as set forth in claim 28, wherein:
said upper surface of said base member has a preselected coefficient of friction, which in conjunction with the weight of the display cards and the weight of that portion of said synthetic sheet member overlying said display cards at least in part retains said display cards in place.

30. A display as set forth in claim 29, wherein:
at least one of said display cards is constructed from paperboard.

31. A display as set forth in claim 30, wherein:
at least one of said display cards includes an ultraviolet responsive fluorescent dye or pigment.

32. A display as set forth in claim 1, wherein:
said synthetic sheet member includes a static electrical charge which draws said synthetic sheet member toward said base member to at least in part securely retain said display card at a preselected position between said base member and said synthetic sheet member without separate fasteners.

33. A display as set forth in claim 1, wherein:
said synthetic sheet member includes opposite side edges extending longitudinally along opposite sides thereof; and
at least one of said side edges is configured to be manually grasped and lifted upwardly to facilitate insertion and removal of said display cards from between said synthetic sheet member and said base member at said insert area.

34. A display as set forth in claim 1, wherein:
said display is configured to permit said display card to be inserted and removed from said insert area from along opposite sides of said synthetic sheet member.

35. A display as set forth in claim 1, wherein:
said insert area is configured to simultaneously receive and retain therein a plurality of said display cards.

36. A display as set forth in claim 1, wherein:
said base member includes a flat upper surface on which said synthetic sheet member is abuttingly supported; and
said display card is positioned directly on said flat upper surface for abutting support thereon.

37. A display as set forth in claim 1, wherein:
said preselected indicia on said display card define a message personal to a selected bowler to temporarily personalize said bowling lane for the selected bowler.

38. A display as set forth in claim 1, wherein:
said display card is removed from said insert area and retained as a souvenir by a bowler using said bowling lane.

39. A display as set forth in claim 1, wherein:
said preselected indicia on said display card define the likeness of a bowler using said bowling lane.

40. A display as set forth in claim 1, wherein:
said preselected indicia on said display card define advertising.

41. A display as set forth in claim 1, wherein:
said preselected indicia on said display card define advertising for goods or services available for purchase at the associated bowling center.

42. A display as set forth in claim 1, wherein:
said preselected indicia on said display card define a training aid for a bowler using said bowling lane.

43. A display as set forth in claim 1, wherein:
said display card includes a pressure activated switch which is actuated when the bowling ball rolls thereover.

44. A display as set forth in claim 1, wherein:
said preselected indicia on said display card define a design to ornament the bowling center.

45. A display as set forth in claim 1, wherein:
said preselected indicia on said display card define a game to be played on said bowling lane with the bowling ball.

46. A display as set forth in claim 1, wherein:
said preselected indicia on said display card include an illuminated portion.

47. A display as set forth in claim 1, wherein:
said preselected indicia on said display card are formed by programmable LEDs.

48. A display as set forth in claim 1, wherein:
said trailing end of said synthetic sheet is connected with said base member adjacent said pin deck area to retain said synthetic sheet member in said overlying relationship with said base member along the length of said bowling lane.

49. A display as set forth in claim 1, wherein:
said insert area and said central portion of said synthetic sheet member extend between said leading end and said trailing end of said synthetic sheet member, with said central portion being unattached to said base member, such that said base member can shift without distorting the shape of said synthetic sheet member, and said display card can be positioned anywhere along the length of said central portion.

50. A display as set forth in claim 1, wherein:
said upper support surface of said base member is constructed primarily of wood.

51. A display as set forth in claim 1, wherein:
said synthetic sheet member has a predetermined width defined between opposite side edges thereof and said display card has a preselected width that is less than the predetermined width of said synthetic sheet member.

52. A display as set forth in claim 1, wherein:
said synthetic sheet member comprises a single, continuous polymer sheet.

53. A display as set forth in claim 1, wherein:
said synthetic sheet has a thickness in the range of 0.63 to 2.5 mm.

54. A display as set forth in claim 1, wherein:
said synthetic sheet comprises a mixture of lubricious polymeric material and polycarbonate.

55. A display as set forth in claim 1, wherein:
said display card has a thickness in the range of 0.63 to 1.25 mm.

56. A display as set forth in claim 1, wherein:
said base member has a flat upper surface with a preselected coefficient of friction, which in conjunction with the weight of the display card and that portion of said synthetic sheet member overlying said display card at least in part retains said display card in place.

57. A display as set forth in claim 1, wherein:
said display card is constructed from paperboard.

58. A display as set forth in claim 1, wherein:
said display card includes an ultraviolet responsive fluorescent dye or pigment.

59. A display as set forth in claim 1, wherein:
said display card includes a design to ornament the bowling center.

60. A display as set forth in claim 1, including:
a black light positioned under said insert area to illuminate said display card from a lower face thereof.

61. A method for displaying indicia in bowling centers, comprising:
providing at least one bowling lane having a base member including an approach area thereof, a pin deck end area thereof and a lane area thereof extending between the approach area and the pin deck area;
providing a generally transparent synthetic sheet member including a leading end thereof, a trailing end thereof, and a central portion thereof;
positioning the synthetic sheet member over at least a portion of one of the approach, the pin deck area and the lane area;
attaching the leading end of the synthetic sheet member to the base member to retain the synthetic sheet member in an overlying relationship with the base member, whereby at least a portion of the synthetic sheet member is unattached to the base member to define an insert area of the bowling lane;
providing at least one display card having preselected indicia thereon and a generally thin profile; and inserting the display card between the synthetic sheet member and the base member at the insert area, such that the preselected indicia are visible through the synthetic sheet member and protected thereby, with the weight of the synthetic sheet member at least in part retaining the display card in place to facilitate quick and easy insertion and removal of the display card to provide varied displays.

62. A method as set forth in claim 61, wherein:
said display card providing step comprises providing a plurality of said display cards, each having different preselected indicia thereon; and
said display card inserting step comprises manually inserting at least one of the display cards between the synthetic sheet member and the base member at the insert area, manually removing the one display card therefrom without disassembly of the bowling lane, and manually inserting a different one of the display cards between the synthetic sheet member and the base member at the insert area.

63. A method as set forth in claim 61, including:
providing the synthetic sheet member with a static electrical charge to draw the synthetic sheet member toward said base member to at least in part securely retain the display cards at preselected positions therebetween without separate fasteners.

64. A method as set forth in claim 61, wherein:
said display card inserting step includes manually grasping a side edge of the synthetic sheet member and lifting the same upwardly to facilitate insertion and removal of the display cards from between said synthetic sheet member and said base member at said insert area.

65. A method as set forth in claim 61, including:
arranging the preselected indicia on at least one of the display cards to define a message personal to a selected bowler to temporarily personalize the bowling lane for the selected bowler.

66. A method as set forth in claim 61, including:
removing the display card from the insert area for retention by the selected bowler as a souvenir.

67. A method as set forth in claim 61, including:
arranging the preselected indicia on the display card to define the likeness of a selected bowler.

68. A method as set forth in claim 61, including:
arranging the preselected indicia on the display card to define advertising.

69. A method as set forth in claim 61, including:
arranging the preselected indicia on the display card to define advertising directed to goods or services available for purchase at the associated bowling center.

70. A method as set forth in claim 61, including:
arranging the preselected indicia on said display card to define a training aid for a bowler using the bowling lane.

71. A method as set forth in claim 61, including:
mounting a pressure actuated switch to the display card which is actuated when the bowling ball rolls thereover.

72. A method as set forth in claim 61, including:
arranging the preselected indicia on the display card to define a design to ornament the bowling center.

73. A method as set forth in claim 61, including:
arranging the preselected indicia on the display card to define a game to be played on the bowling lane with the bowling ball.

74. A method as set forth in claim 61, including:
positioning a black light under the insert area to illuminate the display card from a lower face thereof.

75. A method as set forth in claim 61, including:
connecting the trailing end of the synthetic sheet with the base member adjacent the pin deck area to retain the synthetic sheet member in the overlying relationship with the base member along the length of the bowling lane, such that the insert area and the central portion of the synthetic sheet member extend between the leading end and the trailing end of the synthetic sheet member, with the central portion being unattached to the base member, such that the base member can shift without distorting the shape of the synthetic sheet member, and the display card can be positioned anywhere along the length of the central portion.

76. A display for bowling centers comprising:
at least one bowling lane having:
a base member including an approach area thereof, a pin deck end area thereof and a lane area thereof extending between said approach area and said pin deck area;
a generally transparent synthetic sheet member overlying at least a portion of one of said approach area, said pin deck area and said lane area of said base member, and including marginal edges defining a central portion therebetween;
an attachment member securely attaching at least one of said marginal edges of said synthetic sheet member to said base member to retain said synthetic sheet member in an overlying relationship with said base member, whereby at least a portion of said synthetic lane member is unattached to said base member to define an insert area of said bowling lane;
and at least one display card having preselected indicia thereon and a generally thin profile to insert said display card between said synthetic sheet member and said base member at said insert area, such that said preselected indicia are visible through said synthetic sheet member and protected thereby, with the weight of said synthetic sheet member at least in part retaining said display card in place to facilitate quick and easy insertion and removal of said display card to provide varied displays.

77. A display as set forth in claim 76, including:
a plurality of said display cards, each having different preselected indicia thereon and being configured for manual insertion between said synthetic sheet member and said base member at said insert area, and manual removal therefrom without disassembly of said bowling lane.

78. A display as set forth in claim 77, wherein:
said synthetic sheet member includes a static electrical charge which draws said synthetic sheet member toward said base member to securely capture and retain said display cards at preselected positions therebetween without separate fasteners.

79. A display as set forth in claim 78, wherein:
said preselected indicia on at least one of said display cards define a message personal to a selected bowler to temporarily personalize said bowling lane for the selected bowler.

80. A display as set forth in claim 79, wherein:
said one display card is removed from said insert area and retained by the selected bowler as a souvenir.

81. A bowling lane, comprising:
a base member including an approach area thereof, a pin deck end area thereof and a lane area thereof extending between said approach area and said pin deck area;
a generally transparent synthetic sheet member overlying at least a portion of one of said approach area, said pin deck area and said lane area of said base member, and including marginal edges defining a central portion therebetween;
an attachment member securely attaching at least one of said marginal edges of said synthetic sheet member to said base member to retain said synthetic sheet member in an overlying relationship with said base member, whereby at least a portion of said synthetic lane member is unattached to said base member to define an insert area of said bowling lane; and
at least one display card having preselected indicia thereon and a generally thin profile to insert said display card between said synthetic sheet member and said base member at said insert area, such that said preselected indicia are visible through said synthetic sheet member and protected thereby, with the weight of said synthetic sheet member at least in part retaining said display card in place to facilitate quick and easy insertion and removal of said display card to provide varied displays.

82. A bowling lane as set forth in claim 81, including:
a plurality of said display cards, each having different preselected indicia thereon and being configured for manual insertion between said synthetic sheet member and said base member at said insert area, and manual removal therefrom without disassembly of said bowling lane.

83. A bowling lane as set forth in claim 82, wherein:
said synthetic sheet member includes a static electrical charge which draws said synthetic sheet member toward said base member to securely capture and retain said display cards at preselected positions therebetween without separate fasteners.

84. A bowling lane as set forth in claim 83, wherein:
said preselected indicia on at least one of said display cards define a message personal to a selected bowler to temporarily personalize said bowling lane for the selected bowler.

85. A bowling lane a set forth in claim 84, wherein:
said one display card is removed from said insert area and retained by said selected bowler as a souvenir.

86. A bowling lane as set forth in claim 83, wherein:
said preselected indicia on at least one of said display cards define advertising directed to goods or services available for purchase at the associated bowling center.

87. A bowling lane, comprising:
a base having an approach area thereof, a pin deck area thereof, a lane area thereof with an upper surface thereof extending between said approach area and said pin deck area, and a foul line disposed along an upper lane end of said lane area;
a well disposed in said lane area of said base member a preselected spaced apart distance downlane of said foul line, and including a substantially transparent top member disposed generally flush with said upper surface of said lane area, and an insert area disposed below said top member;
and at least one display having preselected indicia thereon and configured to be positioned in said insert area, such that said preselected indicia are visible through said transparent top member and protected thereby.

88. A bowling lane as set forth in claim 87, including:
a light box disposed under said well to back light said display.

89. A bowling lane, including:
an approach having an upper surface thereof;
a pin deck area having an upper surface thereof positioned substantially coplanar with said upper surface of said approach area; and
a recessed lane area extending between said approach area and said pin deck area, and having an upper surface thereof disposed below said upper surfaces of said approach area and said pin deck area configured for receiving a display item wherein said display item is a programmable LED panel supported on said recessed lane area, and having an upper surface thereof positioned substantially coplanar with said upper surfaces of said approach area and said pin deck area, and defining a playing surface over which a bowling ball is rolled from said approach area to said pin deck area.

* * * * *